US012106041B1

(12) United States Patent
Coil et al.

(10) Patent No.: US 12,106,041 B1
(45) Date of Patent: Oct. 1, 2024

(54) AUTOMATED DOCUMENT GENERATION AND PERSONALIZATION SYSTEM

(71) Applicant: SIMPLE DIVORCE, LLC, Sandy, UT (US)

(72) Inventors: Jill Coil, Sandy, UT (US); Ryan Coil, Sandy, UT (US); Kade Bishop, Orem, UT (US); Emily Chambers, Bluffdale, UT (US); Luke Shaw, Spanish Fork, UT (US); Joseph VanWagoner, Herriman, UT (US); Paul Wyner, Saratoga Springs, UT (US); Sela Nock, West Jordan, UT (US)

(73) Assignee: SIMPLE DIVORCE, LLC, Sandy, UT (US)

( * ) Notice: Subject to any disclaimer, the term of this patent is extended or adjusted under 35 U.S.C. 154(b) by 0 days.

(21) Appl. No.: 17/476,216

(22) Filed: Sep. 15, 2021

Related U.S. Application Data

(60) Provisional application No. 63/078,709, filed on Sep. 15, 2020.

(51) Int. Cl.
 *G06F 40/174* (2020.01)
 *G06F 3/0482* (2013.01)
 (Continued)

(52) U.S. Cl.
 CPC .......... *G06F 40/174* (2020.01); *G06F 3/0482* (2013.01); *G06F 3/04842* (2013.01); *G06F 40/106* (2020.01); *G06F 40/186* (2020.01)

(58) Field of Classification Search
 CPC .... G06F 40/174; G06F 40/106; G06F 3/0482; G06F 3/04842; G06F 40/186
 See application file for complete search history.

(56) References Cited

U.S. PATENT DOCUMENTS

| 11,379,651 B1 * | 7/2022 | Mason | G06F 40/186 |
| 2003/0084046 A1 * | 5/2003 | Rogers | G06F 16/217 |
| | | | 707/E17.093 |

(Continued)

OTHER PUBLICATIONS

DocuSign, Wikipedia, retrieved from https://en.wikipedia.org/wiki/DocuSign on Sep. 15, 2021 (7 pages).

(Continued)

*Primary Examiner* — Kyle R Stork
(74) *Attorney, Agent, or Firm* — VLP Law Group LLP; Michel Bohn

(57) ABSTRACT

An example method presents a system for configuring and applying a document-generation tool to automatically generate documents. The system may perform operations including providing, for presentation by a display device, a graphical user interface including user-configurable elements for configuring a document-generation tool and a preview region; determining form elements that define attributes of the document generation tool; and generate a graphical form preview of the document-generation tool based on the first form element. In some implementations, the system may determine rules of the document-generation tool, which may define a condition and an executable action that affect the display of the graphical form preview using the form elements and may update the graphical form preview on the graphical user interface based on the rules.

20 Claims, 12 Drawing Sheets

(51) Int. Cl.
*G06F 3/04842* (2022.01)
*G06F 40/106* (2020.01)
*G06F 40/186* (2020.01)

(56) References Cited

U.S. PATENT DOCUMENTS

| | | | | |
|---|---|---|---|---|
| 2010/0299389 | A1* | 11/2010 | Boyer | G06F 40/131 |
| | | | | 709/203 |
| 2013/0104030 | A1* | 4/2013 | Parreira | H04L 67/02 |
| | | | | 715/234 |
| 2015/0026562 | A1* | 1/2015 | Brown | G06F 40/143 |
| | | | | 707/758 |
| 2019/0058992 | A1* | 2/2019 | Kurian | H04W 12/06 |

OTHER PUBLICATIONS

LegalZoom, Wikipedia, retrieved from https://en.wikipedia.org/wiki/LegalZoom on Sep. 15, 2021 (4 pages).

TurboTax, Wikipedia, retrieved from https://en.wikipedia.org/wiki/TurboTax on Sep. 15, 2021 (6 pages).

* cited by examiner

AUTOMATED DOCUMENT GENERATION AND PERSONALIZATION SYSTEM

BACKGROUND

The present specification generally relates to providing an improved graphical interface and associated system for automatically generating one or more documents using input from multiple users, such as legal documents.

Previously, professionals would consult with their clients to manually and subjectively draft documents, such as divorce documents, but these manual drafting efforts are time consuming, inconsistent, and expensive. Previous attempts to automate document drafting frequently fail because they are very difficult to build and configure, which is not practical for professionals who have little to no computer coding experience, time, or resources to create an automated system.

Due to these factors, there is a gap in the market for access to legal or other professionally tailored documents, such as for divorce. Additionally, laypeople typically cannot draft their own legal documents, especially for divorce proceedings, due to the complexity of legal and factual issues, law that varies between jurisdictions, lack of legal knowledge, and writing ability.

Some technologies have attempted to remedy the expense and lack of access to legal help through such issues. However, these previous solutions focus on helping a single user, do not customize documents to a specific situation, are not user friendly, and may still require significant manual drafting.

Accordingly, a flexible but robust solution for automatically generating documents is needed along with a system that intelligently and adaptively creates document-generation tools that may be applied across a variety of fields, contexts, and jurisdictions.

SUMMARY

An automated document generation and personalization system can be configured to perform particular operations or actions by virtue of having software, firmware, hardware, or a combination of them installed on the system that in operation causes or cause the system to perform the actions. One general aspect of the system includes a method that includes: providing a graphical user interface for configuring a document-generation tool; determining one or more form elements of the document-generation tool, a first form element of the one or more form elements defining an attribute of the document-generation tool; generating, on the graphical user interface, a graphical form preview of the document-generation tool based on the first form element; determining one or more rules of the document-generation tool, each of the one or more rules defining a condition and an action executable by the one or more processors based on the condition, a first rule of the one or more rules affecting a display of the graphical form preview using the first form element; and updating the graphical form preview on the graphical user interface based on the first rule.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

Figure 1:
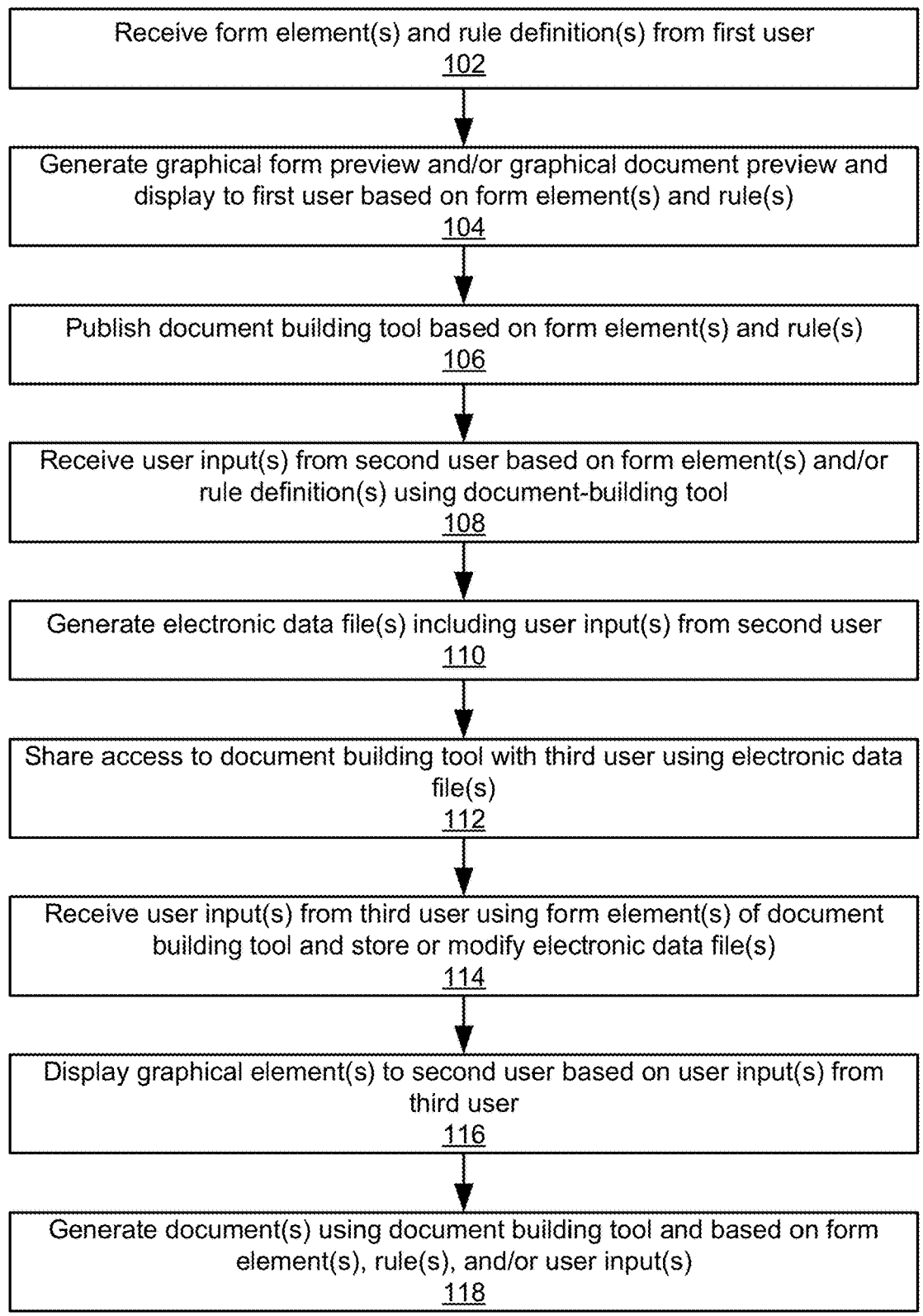
FIG. 1 is a flowchart of an example method for configuring and using a document-generation tool.

The disclosure is illustrated by way of example, and not by way of limitation in the figures of the accompanying drawings in which like reference numerals are used to refer to similar elements. The technology disclosed herein includes computing systems, methods, user interfaces, data, and other aspects that provide the operations and interfaces described herein, as described in further detail below.

Some implementations of the technology allow a user to easily create or configure an intelligent tool or workflow for automatically generating documents, for example. Workflows for various applications or legal proceedings may be buildable or configurable by administrative users or experts with associated knowledge. For example, the technology may automatically define logic and operations based on comparatively simple configuration inputs provided by an administrative user, who may have little to no experience coding software. For instance, the administrative user may provide questions or other form elements; document templates, text, graphics, or other document elements; and select various graphical elements to configure an intelligent document-generation tool, which may use the logic, operations, and other data to assist a user to generate a form, tool, and/or document based on the administrative user's configuration. For example, a legal expert in divorce but not coding may use the operations described below to configure a workflow for divorce in which they create a questionnaire and corresponding logic without programming the questionnaire in a software language. He technology may also educate the end-user on how to complete the form element within the tool or questionnaire. The technology may then automatically use the configured questionnaire and end-user responses to automatically generate various forms and/or documents.

In some implementations, the technology allows administrative users to collaborate on the configuration or creation of a document-generation tool, for example, to create workflows, rules, documents, etc., which may then be published for use by others. For example, administrative users may separately view, comment on, or edit a workflow (e.g., as described below). For instance, a workflow may be substantially configured by a first administrative user and then a second administrative user may view, edit, and/or approve the workflow before, after, or while it is being published for access by other users (e.g., end users who may use the workflow/tool to generate documents).

A workflow may be a set of inputs, form elements, rules, operations, and/or other features, which may be used, for example, to create a questionnaire that guides an end user through a complicated process and generates customized documents through simple queries and interactions.

In some implementations, a workflow and its associated data may be copied and used by an administrative user. For example, a workflow or tool may be configured for a first proceeding in a first jurisdiction and then copied and customized to a second jurisdiction.

The technology described herein also provides improved interfaces and operations for building intelligent automated forms or other tools that may automatically generate or populate documents. For example, the technology may include a document synthesis application 708, which is executable to provide interfaces and operations, such as those described below. An instance of the document synthesis application 708 may be executed on a centralized or distributed server or computing system to provide the operations described herein. For instance, the document synthesis application 708 may allow users to access (e.g., by an authenticated, role-based login) the functionality described herein to configure workflows and/or generate documents. The document synthesis application 708 may allow an administrative user to configure workflows and document-generation tools and then provide access to the workflows/document-generation tools on behalf of the administrative user (e.g., to end users to generate documents), for example, via a website with access levels (e.g., administrative, configurator, document-generation access, view access, comment access, edit access, etc.) associated with user log-ins and/or via a subdomain accessible via a third-party server (e.g., via a sub-domain or redirect from the administrative user's website).

In some implementations, instances, components, or functionality of the document synthesis application 708 may be distributed to provide functionality on other servers or computing devices. An instance of the document synthesis application 708 may be executed on a client device or third-party server. For example, a legal expert may run an instance of the document synthesis application 708 on a proprietary server, and, using this instance of the application, the legal expert may configure workflows and use it to provide access to end users to automatically generate documents on behalf of the end users.

Some implementations of the technology provide a set of interfaces that facilitate generation of documents for various users, provide information regarding various aspects of the documents by answering questions, address disputes, and reconcile differences.

Some implementations of the technology described herein may, for example, relate to a computer solution for programmatically generating high quality documents, such as divorce documents, for individuals or couples that cannot afford an attorney or choose not to use one. The technology described herein provides the ability to create and draft enforceable decrees that can be filed with a court. Although this disclosure refers to generating divorce documents as an example of the application of the technology, the technology may be used in many various contexts to provide various types of documents.

For example, the technology may use templates and other resources to guide users through a legal or other process (e.g., divorce, real estate purchase, etc.) and assist the users in making decisions, such as hiring a legal professional, or ascertaining rights and obligations of the users. The technology provides a flexible tool for creating documents, for example, because legal proceedings are highly specific to facts, laws of a particular jurisdiction, proceeding (e.g., type of proceeding, such as a divorce, real estate contract, purchase agreement, etc.), or parties involved.

For example, the technology may provide a user-friendly tool that both walks users through individual elements for creating legal documents and intelligently provides information for answering questions and knowledgeably making decisions. It may also allow an administrative user to make the questionnaire automatically adaptable, thereby allowing the end user to see only the questions that are applicable to their circumstances. For instance, the technology may provide brief and/or detailed explanations of decisions that allow the technology to generate a decree or other document. After the technology collects data (e.g., from various computer databases, servers, or user inputs, etc.) pertaining users through a series of queries, it may use various programmed rules and elements to automatically generate documents. These operations may reduce human error by programmatically proceeding through operations in ways that were not performed previously. For instance, while a human would subjectively consider potential issues for a proceeding, the technology described herein intelligently determines which questions to ask and uses responses, for example, based on the configuration of the tool.

In some implementations, the technology may detect that one or more users are unable to resolve his/her proceeding or come to an agreement on their own and, accordingly, intelligently direct the user(s) to tools or professionals for additional services.

Some implementations of the technology may include an online portal to archive and secure received information and/or generated documents that may be accessed by a computer processor for performing various tasks, such as those described herein. In some instances, the technology may include unlockable components where each section is unlocked as users satisfy certain conditions. For example, if users are unable to come to a resolution, unlockable sections reduce computational processing cycles and network bandwidth used, along with user time, for completing operations and generating documents that the parties would not be able to use (e.g., due to disagreement, legal constraint, or failure to satisfy an element or defined rule, as described below). In some implementations, where operations are unlocked based on purchase, the total cost or costs of individual sections may also be automatically adjusted or subsidized based on information provided by user (e.g., income verification, etc.), although other implementations are possible.

For the purposes of this disclosure, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 is a flowchart of an example method for configuring and applying a document-generation tool. It should be noted that the operations of the method may be reduced, reordered, or augmented without departing from the scope of this disclosure. Depending on the implementation, the operations and features of the figures herein may be exchanged, for example, additional operations and details of the method described in FIG. 1 may be described in reference to the methods of FIGS. 2-5 and vice-versa; although, it should be noted that other implementations are possible and contemplated herein. As described herein, a document-generation tool may include various workflows, form elements, rules, documents, document elements, and other features, which may be used to automatically generate and/or fill one or more documents.

It should be noted that although examples of the method described in reference to FIG. 1 are described in reference to interactions with one or more administrative users (e.g., a user who configures a document-building tool) and/or one or more end users (e.g., a user who interacts with a document-building tool to generate a document), other implementations are possible and contemplated herein. For example, the document synthesis application 708 may perform operations 102-106 via communication with an administrative user, 108-112 via communication with a first end user, 114-116 via communication with a second end user, and 118 completely autonomously and/or via communication with any of the administrative or end users. Similarly, in some implementations, the document synthesis application 708 may provide interaction with a single user for some or all of these operations without departing from the scope of this disclosure.

At 102, the document synthesis application 708 may receive form element(s) and/or rule definition(s) from a first administrative user. A form element may define a question, format, information area, or user input or configuration element of a form, questionnaire, workflow, or tool. For example, a form element may include a question and/or user input field. A form element may include a question requesting user input or instruction (e.g., a page break, a header, etc.) that affects a graphical arrangement of document-generation tool or form preview. Form elements are described in further detail below, for example, in reference to operation 204 in FIG. 2.

The document synthesis application 708 may receive configurations for one or more rules associated with form elements, user inputs, and or document elements (e.g., as described below). A rule may include a logical condition and associated action that define when to display form elements, permissions for sharing access to a document-building tool or form element, conditional actions for retrieving or providing data (e.g., inserting document elements or other data into a document file), and other operations. Rules and their configuration are described in further detail elsewhere herein, for example, in reference to operation 208 in FIG. 2.

The document synthesis application 708 may receive one or more documents or document templates from a user when configuring the document-generation tool. For instance, a document may be a blank word-processor file into which text, formatting, and other data may be inserted based on form elements, user inputs, and/or document elements. In some implementations, the document may be a template flat or fillable PDF (portable data format) or image file into which document elements may be inserted.

A document element may include static or dynamic text (e.g., defined words, sentences, paragraphs, etc.), graphics (e.g., checkmarks, highlighting, circles, "sign here" indicators, etc.), images (e.g., photographs), files (e.g., files, documents, bulk data, etc.), formatting (page breaks, carriage returns, tabs, font configurations, etc.), or data that the document synthesis application 708 may insert into a document file. For example, when called for by a rule (e.g., responsive to a user input to a form element), the document synthesis application 708 may insert a defined word, sentence, or paragraph of text into a word-processor or PDF file. For instance, a rule or document element may be defined to insert text or a graphical element at a defined location (e.g., based on pixel or vector coordinates, data field, tag, or other context) in a document.

In some implementations, the text may include or be based on a user input responsive to a user input. For instance, if a user indicates a text input in an input field (a first form element) and provides a certain input to a multi-checkbox input (a second form element), the document synthesis application 708 may determine one or more paragraphs of text (e.g., document element(s)) and insert text (e.g., based on the received user inputs) into the paragraph(s) based on associated rules.

Similar to the dynamic form elements described above, a document element may be dynamic so that it is determined at runtime, for example, when generating a document or document preview. For instance, a dynamic document element may be a paragraph, page, or other quantity (e.g., a Roman or Arabic numeral) that may be modified by the document synthesis application 708 when generating a document or preview based on other corresponding dynamic document elements in the document. For example, the document synthesis application 708 may ignore unrendered dynamic document elements or tags when determining the values of the dynamic document element(s) in order to accurately display numbering.

At 104, the document synthesis application 708 may generate a graphical form preview and/or graphical document preview, which it may provide for display to a user on a client device of the user (e.g., an administrative user configuring the tool, although, it may also be displayed for an end-user). The preview may be rendered in a preview region of the graphical user interface and its attributes may be based on the defined form element(s) and rule(s).

A form preview may be a preview of a form or document-generation tool as it may be displayed to an end-user. In some implementations, the form preview may allow user interaction and use associated logic and workflow to provide functionality of the document-generation tool, so that an administrative user may view and experiment with the document-generation tool during its configuration. In some instances, the form preview may be displayed together on the same graphical user interface as the configuration tools.

A document preview may be a preview of a document that may be generated or filled based on the configured document-generation tool/workflows. For instance, where the document synthesis application 708 provides the form preview to receive user input (e.g., test inputs by the administrative user), the document synthesis application 708 may automatically (e.g., periodically, in real time, or in response to a trigger) update the document preview to reflect the user inputs into the form preview. In some implementations, the document preview may be displayed adjacent to the form preview so that the effects of changes to the form preview may be easily viewed. For example, the previews may be rendered side-by-side on the same graphical interface or page. By providing both the form preview and the document preview, the document synthesis application 708 may reduce unnecessary publishing or back navigation by an administrative user configuring a document-generation tool/workflow.

As described below, the document synthesis application 708 may additionally or alternatively render a document preview to an end user filling out a form or otherwise using the document-generation tool.

At 106, the document synthesis application 708 may publish a document building tool based on the form element(s) and/or rule(s). For instance, the document synthesis application 708 may publish the configured workflows, form elements, and other elements of the tool to a website (e.g., by providing a URL and/or accessible link) for use or interaction by other users. The document synthesis application 708 may provide a second graphical user interface for display to a first end user on a client computing device, which allows user interaction with the document-generation tool by the end user.

During publication or configuration, the document synthesis application 708 may receive additional information for the document-building tool or its workflow(s). For instance, the document-building tool may be associated with a certain context (e.g., a state or other jurisdiction), proceedings (e.g., a divorce, type of divorce, or specific divorce), user (e.g., one or more user accounts), user role (e.g., petitioner, respondent, attorney, etc.), or other context. Accordingly, access to or use of the document-building tool can only be used in matching context (e.g., a divorce-type proceeding in Utah).

In some implementation, if another administrative user or stakeholder is associated with a document-building tool or its associated components, the document synthesis application 708 may perform additional verification operations before publishing the document-building tool. For instance, the document synthesis application 708 may determine that a second administrative user must or can provide final authorization to publish the document-building tool or an update thereto. The document synthesis application 708 may automatically notify the second administrative user, who may edit the configuration or accept publication.

At 108, the document synthesis application 708 may receive one or more user input(s) from a second user in a second graphical user interface based on the form element(s) and/or rule definition(s) using document-building tool. For instance, a user input may be an interaction with a first form element presented to the user on a form based on a defined rule. The document synthesis application 708 may adapt the graphical user interface based on the rule and user input to modify or otherwise customize the interface to the user, for example, by changing the form elements displayed.

At 110, the document synthesis application 708 may generate one or more electronic data file(s) including user input(s) from the user. For instance, the document synthesis application 708 may store the first user input (e.g., from an end user) in association with the first form element in an electronically accessible database.

At 112, the document synthesis application 708 may share access to the document building tool with another end user (or multiple users) using electronic data file(s). For instance, the document synthesis application 708 may receive, via the graphical user interface of the first end user, a request from the first user to share the first form element in a third graphical user interface with a second user. Depending on the configuration of the form elements and/or document-building tool, the document synthesis application 708 may provide access to some or all form elements, information, or functionality to the second end user.

The sharing request may include an access level, such as read-only, comment, or edit, which may indicate actions allowed regarding the form elements of the document-building tool. The document synthesis application 708 may determine whether sharing (e.g., with a requested or automatically determined access level) the document-building tool, workflow, or form element is allowed based on a sharing rule defined by an administrative user.

At 114, the document synthesis application 708 may receive user input(s) from the third user using form element(s) of the document building tool and store or modify electronic data file(s) based on the inputs.

The document synthesis application 708 may automatically adapt the graphical user interface and/or allowed interactions to the second end user based on that user's access level. Accordingly, the format, form elements, and user inputs may be automatically adjusted depending on access/permission level and/or whether a user is sharing or receiving a shared tool, workflow, or form element(s).

In some implementations, the document synthesis application 708 may display some or all of the user inputs from the first user/sharer with the second user/sharee. If the second user has a read-only access level, they may only view the form elements and/or first-user's answers. If the second user has a comment access level, they may provide comments on the first user's inputs or the form elements, for example, the document synthesis application 708 may automatically provide a comment field/input element for some or all of the form elements or user input fields using which second user may provide comments. If the second user has an edit access level, they may edit the edit the first-user's responses to form elements and, depending on defined rules, the document synthesis application 708 may modify displayed form elements for the second user, so that the second user may interact with different form elements from the first user. In some instances, the first user's data may be displayed in a different location (e.g., as a note, expandable bubble, or sub text of an associated form element to the second user) or simply as a pre-filled out user input field.

In some implementations, the document synthesis application 708 may modify the electronic data file storing the first end user's inputs with the comments, changes, or inputs of the second user(s). In some implementations, when sharing access to the document-building tool and/or electronic data file with a second user, the document synthesis application 708 may automatically duplicate the electronic data file (e.g., a data structure including the first user's inputs), so that the second user's inputs or comments do not affect the data integrity of the first user's inputs. Accordingly, if a second user provides input or edits a first user's input, the document synthesis application 708 may only make the edits to the duplicated data file.

In some instances, if the second end user has no comments or edits, the second end user may authorize generation of the document.

At 116, the document synthesis application 708 may display graphical element(s) and or modify the graphical user interface for second user (e.g., the first end user) based on user input(s) from third user (e.g., the second end user).

For example, the document synthesis application 708 may modify the graphical user interface to display the comments, edits, and/or inputs from the second end user. These inputs may be displayed with tracked changes, a change flag, or other indicator.

Depending on the implementation, the first end user may accept, reject, or modify (e.g., by manually changing the inputs) the inputs to form elements based on the second end user's changes. These final changes may be reflected in the original, duplicated, or new electronic data file.

At 118, the document synthesis application 708 may generate document(s) using the document building tool and based on form element(s), rule(s), and/or user input(s).

In some implementations, the first end user may verify the inputs and/or perform other operations (e.g., passing a pay wall) that indicates to the document synthesis application 708 to generate a document. For example, the document synthesis application 708 may receive a signature from the first user and/or the second user and, in response, generate the document by applying the rules to document elements based on the final user inputs indicated by the first and/or second end users. Accordingly, the document synthesis application 708 may automatically generate a customized document file with data inserted and formatted based on the configured document-generation tool including its adaptive workflows.

It should be noted that although some implementations described herein refer to generating a single document, the document synthesis application 708 may automatically generate multiple different documents using the same techniques. For instance, one or more workflows (and/or the input into the workflow(s)) may generate one or more documents with any information from each workflow being applied to any of the documents, depending on the configuration and programming described elsewhere herein.

As described in further detail below, once a document has been generated additional operations may be performed, such as requesting formal signatures from the first and/or second end user, transmitting the document to a computing device or server (e.g., an electronic filing server of a court), or providing instructions to the first and/or second user.

Figure 2:
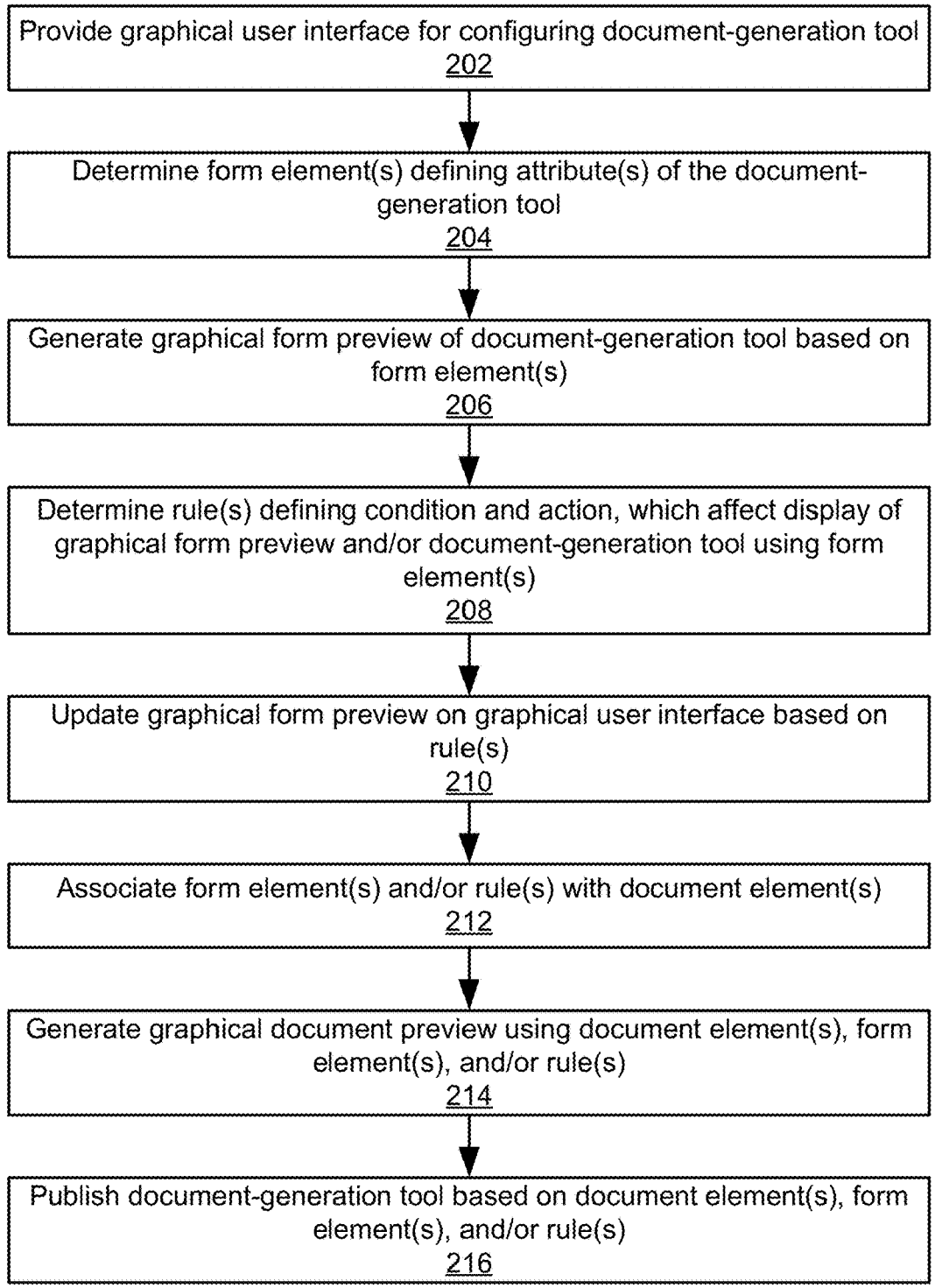
FIG. 2 is a flowchart of an example method for configuring a document-generation tool.

FIG. 2 is a flowchart of an example method for configuring a document-generation tool. It should be noted that although examples of the method described in reference to FIG. 2 are described as being via interaction with an administrative user, other implementations are possible and contemplated herein. For example, one or multiple administrative users and/or end users may separately or collaboratively interact with the document synthesis application 708 in the operations of the method of FIG. 2.

At 202, the document synthesis application 708 may provide a graphical user interface including one or more user-configurable elements for presentation on a display device for configuring document-generation tool and/or preview region. The graphical user interface may allow a user (e.g., an administrative user) to duplicate, create, or edit workflows, form elements, rules, document elements, and other aspects of a document-generation tool. The graphical user interface may also provide interaction with a plurality of users to collaborate in the configuration.

At 204, the document synthesis application 708 may determine one or more form element(s), which may define attribute(s) of the document-generation tool.

A form element may define a question, format, information area, or user input gathering or configuration element of a form, questionnaire, workflow, or other tool. For instance, a form element may include a question, drop down menu, radio button, multiple choice input field, page break, dynamic question number (e.g., updated based on which questions or other elements are rendered in a form based on rules), slider, graphical feature, text-input field, partition, status, form preview, document preview, link, or other element. Each element may be associated with or identified by a unique tag or identifier for future reference or use in configuring a document-generation tool. Form elements may be dynamically displayed or used using rules.

In some implementations, a form element may be a dynamic placeholder that may be defined at runtime. For instance, a form element may include a paragraph or question number, which is updated based on which form elements are displayed (e.g., based a rule or display logic) in a document-building tool, form preview, or document preview. Accordingly, the document synthesis application 708 may automatically place different sequential numbers in a form, questionnaire, etc., wherever a tag or unique identifier for a certain dynamic placeholder form element is located.

Using the graphical user interface, an administrative user may add questions, change their position or sequence (e.g., drag graphical elements representing form elements) to change their order or arrangement (e.g., on a document-generation tool or form preview), duplicate them, delete them, etc. In some instances, as described below, a graphical form preview may be displayed in the graphical user interface and the document synthesis application 708 may automatically re-render or update the form preview as the arrangement and specific form elements are modified. The interface may also receive easily identifiable tags or unique identifiers, which the document synthesis application 708 may automatically associate with the form elements throughout the configuration process.

Figure 6A:
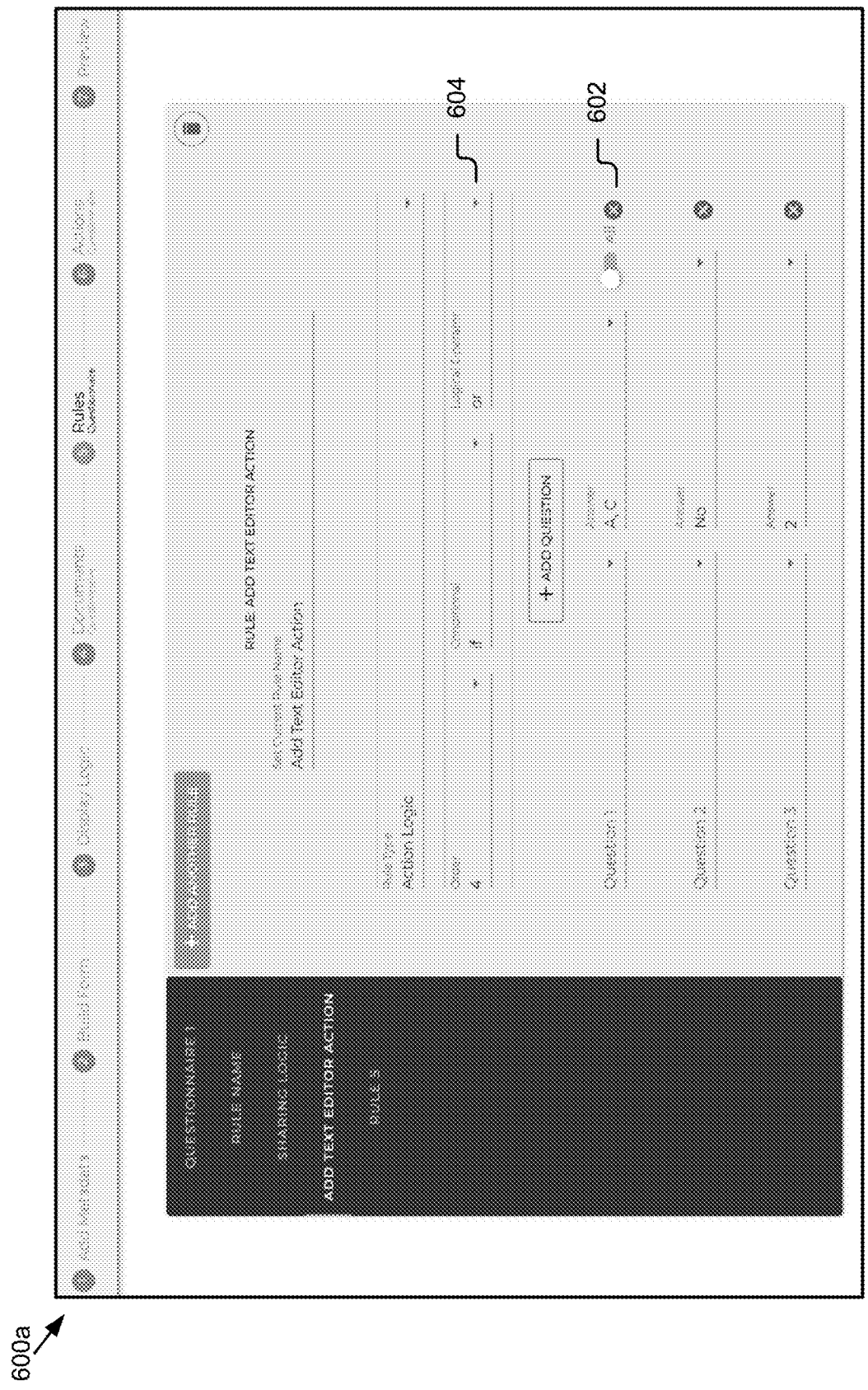
FIG. 6A illustrates an example graphical user interface for configuring rules.
Figure 6B:
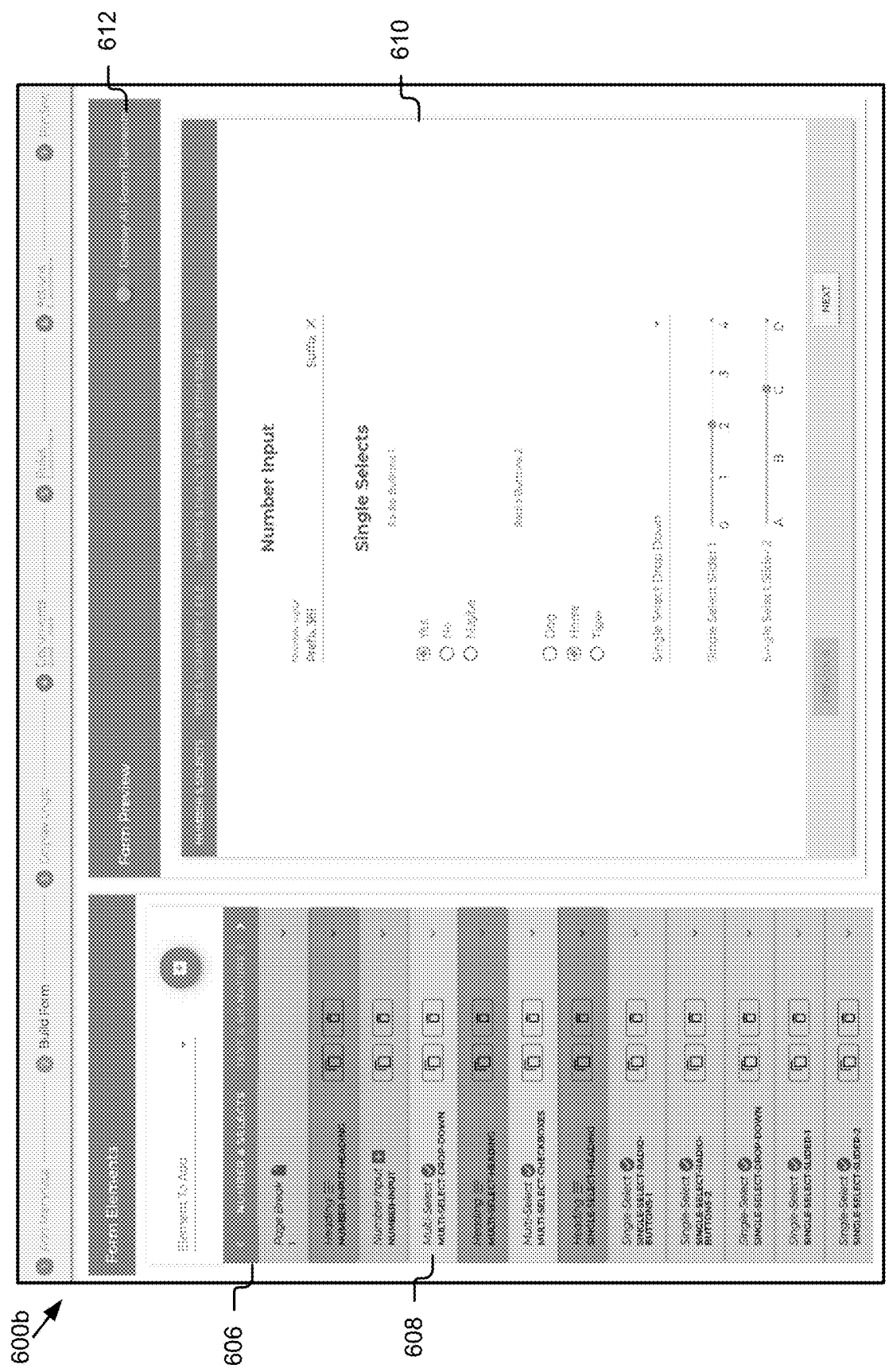
FIGS. 6B and 6C illustrate example graphical user interfaces for defining form elements.

For example, FIG. 6B illustrates an example graphical user interface 600b that allows an administrative user to define a form element, such as a question, conditions associated with the question, and/or other form or document-generation tool attributes. For example, the graphical user interface 600b illustrates a form element list 606 comprising individual graphical representations 608 of form elements that may allow form elements to be duplicated, deleted, or rearranged (e.g., by dragging the graphical representation within the list or identifying, from an outline, where the form element should be moved or placed).

The example graphical user interface 600b, as illustrated, also includes a form preview region 610 in which a form preview may be displayed. As illustrated, the form preview may be populated with form elements based on the form element list 606. In some instances, the form preview region 610 also includes a selectable element 612 that allows all form elements to be displayed or, alternatively, allows the display logic and other rules to dynamically adapt the form preview as described elsewhere herein.

Figure 6C:
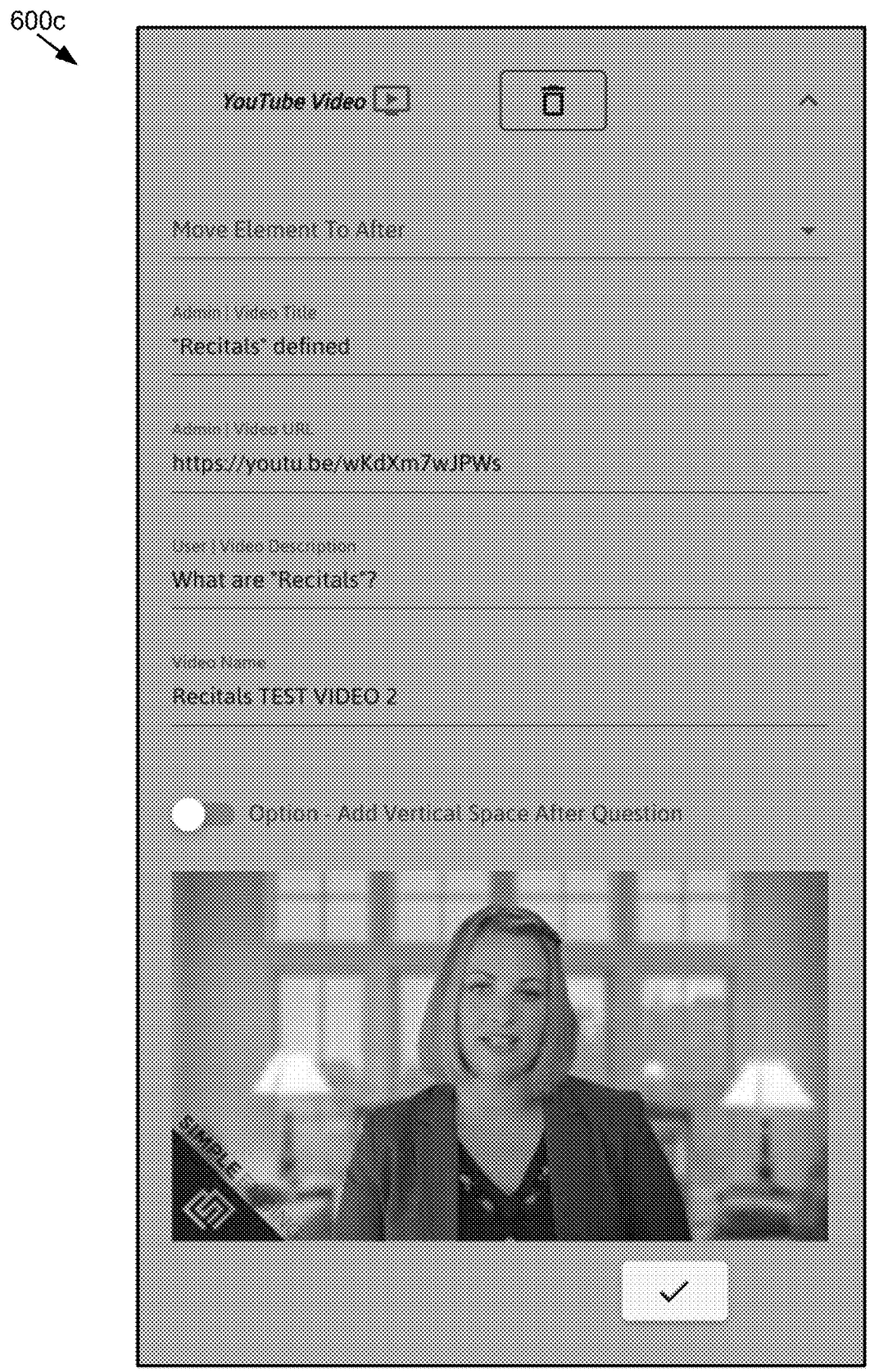

Additionally, FIG. 6C illustrates an example graphical user interface 600c that allows an administrative user to add, define, upload, etc., informational documents, media, etc., for helping a user to understand questions and potential responses to the questions. For example, a form element may be adapted to display informational text or media using the graphical user interface 600c.

Returning to FIG. 2, at 206, the document synthesis application 708 may generate a graphical form preview of the document-generation tool based on the form element(s). For instance, the document synthesis application 708 may automatically render the set of defined form elements as they are arranged by the user (e.g., top to bottom, first to last, left to right, etc.). If certain form elements are dynamic (e.g., as noted above), they may be automatically updated when the preview is rendered or when changes are made in the configuration.

At 208, the document synthesis application 708 may determine one or more rule(s) defining condition(s) and/or action(s), which affect display of graphical form preview and/or use of the document-generation tool using the form element(s).

A user may configure a rule for a workflow or tool. For example, a rule may include one or more condition(s) and action(s) that may be executed by the document synthesis application 708 based on the condition(s) being satisfied. In some instances, the rule (e.g., associated with condition(s)) may also include logical operators (e.g., AND, OR, XOR, NOT). A condition or action may be associated with a form element, user input to a form element, or document element (e.g., text or a graphic inserted into a document). For example, when configuring a rule, a user may reference a tag or unique identifier of a specific form element.

The document synthesis application 708 may define and execute various types of rules, such as a display rule, action rule, or sharing rule. Accordingly, the document synthesis application 708 may automatically vary and customize the fields, format, and/or behavior of a document-building tool, form, or workflow.

A display rule may define when form elements, document elements, form previews, or document previews are displayed (e.g., in a document-generation tool or for preview). For example, when a user provides an answer to a first form element (e.g., a question), the document synthesis application 708 may automatically surface, reformat, or hide a second form element (e.g., data-input field, information, graphical image, or second question).

An action rule may define when various actions in a form or document generation are performed, for instance, the action rule may update graphical interfaces (e.g., in a form or preview, such as a display rule), retrieve information from accessible databases, transmit information, use form or document elements, or perform other operations. For example, an action rule may add data or document elements to a document and/or name, order, or modify document elements. An action rule may additionally or alternatively pull data from a form element, other rule, user input, or other data source, which it may use as a trigger and/or action (e.g., by inserting the retrieved data into a document).

A sharing rule may define quantities, access levels, timings, or other sharing parameters of a document-generation tool, workflow, form, or form element. For example, an administrative user may configure a sharing rule, which defines a quantity of users with which another user may share a workflow, form, or form element. For instance, the document synthesis application 708 may determine, based on a sharing rule, that an end user may share a workflow, form, or certain questions with a second end user. The sharing rule may indicate an allowed access level of the user or system with which an item is shared, such as edit, comment, or view access.

In some implementations, a rule may define attributes of information to be added when generating a document. For instance, as described in further detail below, a rule may indicate that when a certain user input or set of user inputs are received, the document synthesis application 708 should add a defined paragraph of text to a document at a certain location, order, or format. The document synthesis application 708 may use a fully or partially pre-defined paragraph which may, depending on the configuration, incorporate or be based on the user input(s). In another example, the document synthesis application 708 may, based on a rule, apply a certain graphical element, such as a check mark, at a define location in a document (e.g., a checkmark at a defined location in a template document) based on a certain received user input in a form element.

FIG. 6A illustrates an example graphical user interface 600a for configuring rules, for example, the document synthesis application 708 may, via the interface 600a provide various rule types and allow a user to select conditions (e.g., form elements or questions) 602 and logical operators 604. The interface 600a may also allow a user to define an action respective to a form element or document element. In some implementations, when configuring form elements or document elements, the user may insert the name or identifier of a rule thereby causing that form element or document element to be inserted when the rule's trigger or condition is satisfied.

In some implementations, an action may be a configured with a certain font, size, location (e.g., based on a pixel or vector mapping), color, etc., on a document. For instance, an action may include a certain text, graphic, or other document element that is inserted at a defined location in a document.

Returning to FIG. 2, at 210, the document synthesis application 708 may update a graphical form preview on the graphical user interface based on the rule(s) and/or configuration of form elements. For instance, if a rule indicates that a certain form element should be displayed and another form element should be hidden, the document synthesis application 708 may automatically update the display or formatting of the form elements in the preview. In some instances, where form elements are conditionally displayed, the form preview may display the form elements with a note (e.g., being grayed out, an asterisk, etc.) indicating that that form element would or would not be displayed in the final end-user version of the document-building tool.

In some implementations, as described in further detail above, a form preview (e.g., as illustrated in reference to FIG. 6B) may receive interaction and correctly execute rules based on administrator input into the form preview. For instance, the administrative user may provide input to a user input field of a form element, which, based on a display rule, may cause the document synthesis application 708 to change the formatting or display of other elements on the form preview.

At 212, the document synthesis application 708 may associate form element(s) and/or rule(s) with document element(s). For instance, the document synthesis application 708 may associate a document element (e.g., text, graphic, etc.) with an action of a rule in a database, as described in further detail elsewhere herein, such as in reference to FIG. 1. For example, if a form element includes a question, a rule may cause the document synthesis application 708 to insert a document element containing text into a document, which may be previewed in a graphical document preview on the graphical user interface.

At 214, the document synthesis application 708 may generate a graphical document preview using the document element(s), form element(s), and/or rule(s). For instance, the document synthesis application 708 may receive user inputs from an administrative user into the form preview, which inputs cause the document synthesis application 708, based on the rules, to insert or format pre-defined, determined, or dynamic document elements into a document file. In some implementations, the document synthesis application 708 may create a temporary document file, which it may render in the graphical user interface as a graphical document preview. As noted elsewhere herein, the document synthesis application 708 may automatically update the document preview based on inputs in the form preview and/or configuration of the document-generation tool (e.g., changes to form elements, rules, or document elements).

In some implementations, the document synthesis application 708 may display the form preview and document preview simultaneously on the graphical user interface, so that changes to the form preview are immediately viewable on the document preview. In some implementations, the document synthesis application 708 may also display tool or workflow configuration information on the graphical user interface along with the form and document previews so that the document synthesis application 708 displays a change to the form preview and/or document preview in response to a change to the configuration, thereby allowing changes to be easily viewed across several layers of operations. For instance, these changes may typically be performed on different computing devices, at different times, or based on user inputs from multiple users, but this system beneficially allows rapid and reliable changes across the layers.

Figure 6D:
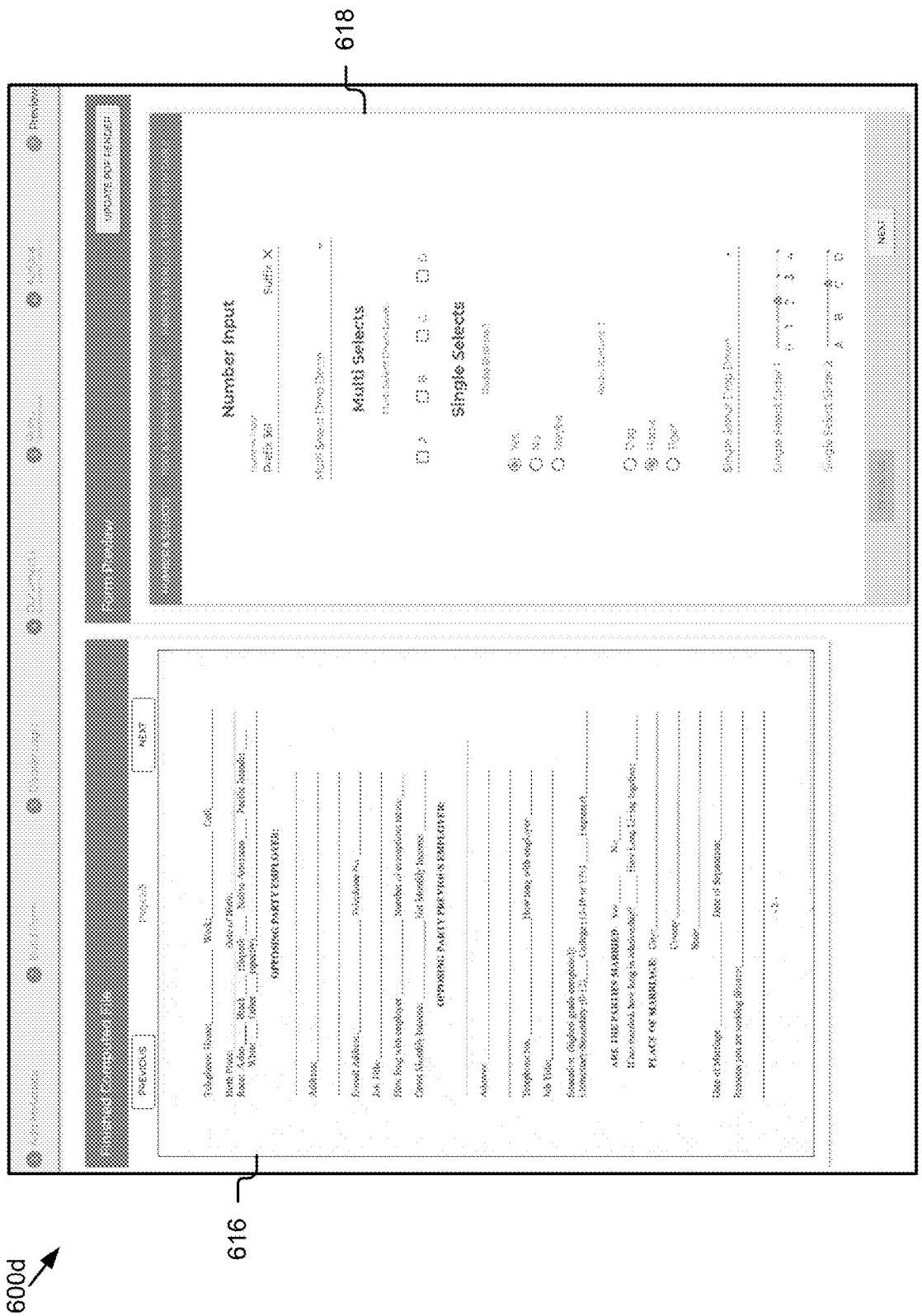
FIG. 6D illustrates an example graphical user interface including a graphical document preview region.

FIG. 6D illustrates an example graphical user interface 600*d* including a graphical document preview region 616, which may illustrate a document template, generated document, and/or other preview. For instance, if a user selects to update a document render, the document synthesis application 708 may automatically generate or populate the file and/or insert text, as described elsewhere herein. As illustrated, the document synthesis application 708 may also render a graphical preview region 618 adjacent to the document preview region 616, thereby allowing a user to quickly test the form, workflow, or other components of the tool.

Returning to FIG. 2, at 216, the document synthesis application 708 may publish document-generation tool based on document element(s), form element(s), and/or rule(s), for example, to provide access to the document-generation tool to a client computing device of a user, as described in further detail elsewhere herein.

Figure 3:
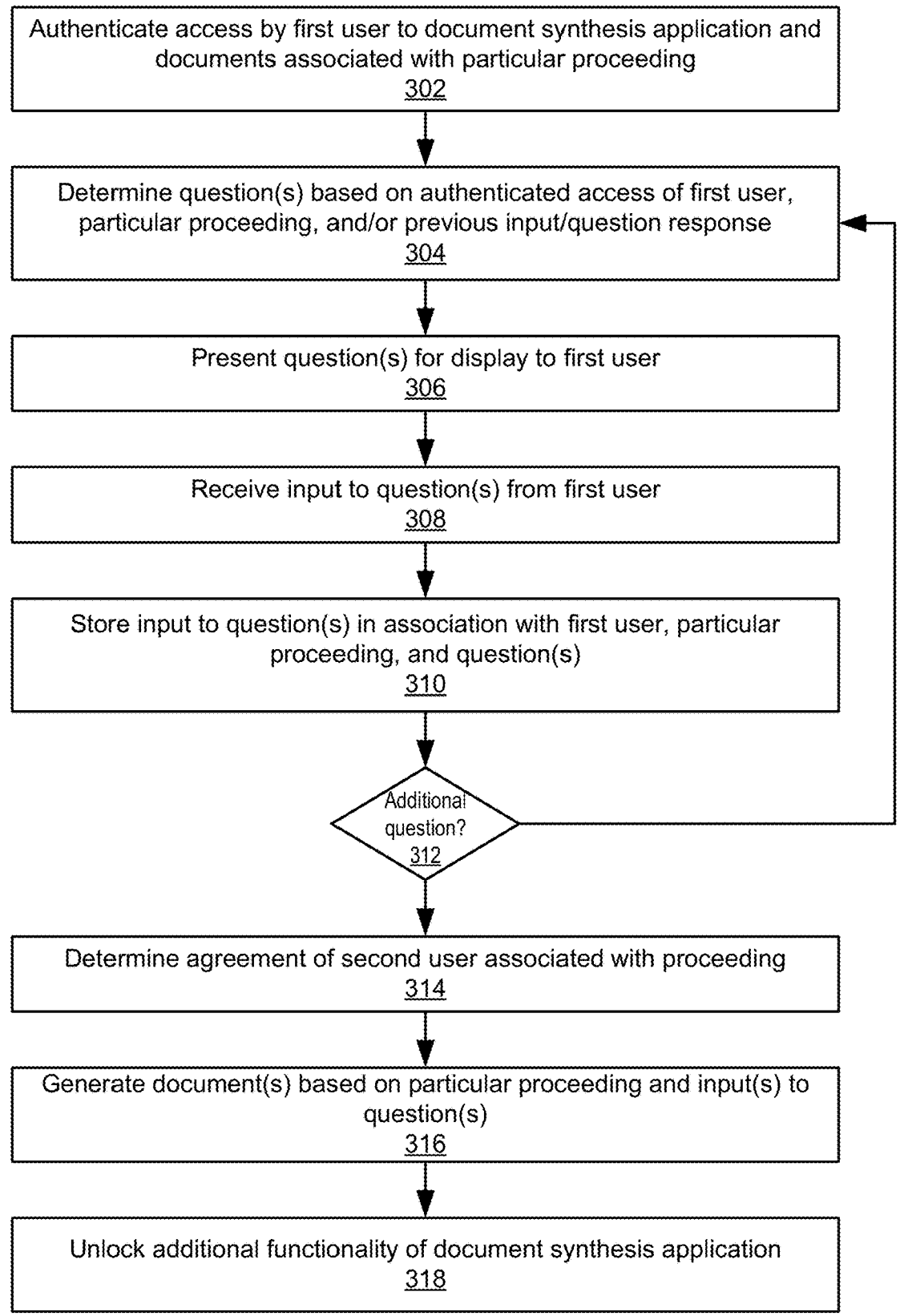
FIG. 3 is a flowchart of an example method for automatically synthesizing documents.

FIG. 3 is a flowchart of an example method for automatically synthesizing documents. The operations described in reference to FIG. 3 may provide illustrative examples of those described above and/or additional features that may be used by the document synthesis application 708, depending on the implementation.

It should be noted that although examples of the method described in reference to FIG. 3 are described in reference to administrative users, other implementations are possible and contemplated herein. For example, the document synthesis application 708 may perform the operations of FIG. 3 via communication with one or more administrative and/or end users, although other implementations are possible.

At 302, the document synthesis application 708 may authenticate access by a first user or petitioner to a document synthesis application 708 and informational documents associated with a particular proceeding or event, such as a petition for divorce.

For example, the document synthesis application 708 may authenticate access (either directly or using an associated web server or authentication service) as follows by receiving a user input regarding a context (e.g., a state or other jurisdiction), document-generation tool eligibility (e.g., whether the user has children, residency status etc.), and other input. The document synthesis application 708 may allow the user to create a username and password. The document synthesis application 708 may also provide various disclosures and agreements regarding representation, confidentiality, etc. In some implementations, the document synthesis application 708 may also receive payment to unlock various functionality.

The document synthesis application 708 may unlock access by the first user to one or more information sources based on the authenticated access of the first user. For instance, the document synthesis application 708 may provide access to blogs, articles, or other content associated with the selected proceeding (e.g., divorce for a particular jurisdiction). For instance, the document synthesis application 708 may determine appropriate informational resources associated with a particular proceeding, jurisdiction, question, party, or circumstance. In some instances, these information resources may be presented, offered, or associated with individual questions or documents, etc., as described below.

In some implementations, the document synthesis application 708 may present a graphical call-to-action element to the user to begin a certain proceeding (e.g., "Start with your divorce?").

At 304, the document synthesis application 708 may determine question(s) based on the authenticated access of first user (e.g., an end user), particular proceeding or event, and/or a previous input/question response. For instance, if the particular proceeding is a divorce in the state of Utah, which may be associated with a particular married couple, the document synthesis application 708 may select one or a series questions to ask a first user for this type or instance of proceeding. The questions may have an associated order and/or conditional relationships, as described in further detail elsewhere herein. Each question may have a written explanation for legal terms, implications of answers, etc., a link to a video explaining the question, and other various associated video, audio, textual, or other informational documents.

Questions may involve one or more of the following example topics: jurisdiction, court of filing, children, legal custody, physical custody, parent time schedule, holiday schedule, parenting plan (e.g., several questions to develop a unique parenting plan specific to each person's situation), child support (e.g., may help parties walk though child support calculator and create a customized child support worksheet), medical support, child care, extra curriculars, travel with children out of state, mutual restraining orders, tax exemptions for children, division of assets, family pets, vehicles, financial assets, debts, alimony, or name change, etc.

At 306, the document synthesis application 708 may present question(s) for display to a first user (e.g., end user), for example, in a graphical user interface with fillable fields, a drop-down menu, etc., for responding to the question.

At 308, the document synthesis application 708 may receive input to question(s) from a first user. For example, if the document synthesis application 708 presents a question regarding whether the couple has any children, the input may include a selection of no children or a quantity of children. The selection of no children versus a quantity of children may result in the document synthesis application 708 selecting varying subsequent questions, as described below.

At 310, the document synthesis application 708 may store the input to the question(s) in association with the first user, particular proceeding, and the question(s) (e.g., form elements). For example, a particular proceeding or event may have a first and second user associated therewith in a database accessible to the document synthesis application 708. The particular proceeding may also have a set of questions or other form elements associated therewith, some or all of which may be presented to one or both of the users by the document synthesis application 708, depending on their specific roles (e.g., petitioner, respondent, tool sharer or sharee, etc.) or specific circumstances (e.g., based on answers to questions, whether the couple has children, an income level, assets, length of marriage, etc.), and various other configured rules. Some or all of the questions may have one or more inputs separately associated therewith. For instance, the document synthesis application 708 may store a first answer by a petitioner, a second answer (e.g., a separate answer, edit of the petitioner's answer, or a comment) by a respondent, and a third answer by the petitioner in association with the question, particular proceeding/ divorce, inputting users, etc., as described in further detail above.

At 312, the document synthesis application 708 may determine whether there are additional questions for the particular procedure. For instance, the document synthesis application 708 may determine, based on a condition associated with a previous question or its response, to ask a defined question (e.g., based on a configured rule). For example, if a previous question indicates that the marriage has children, the document synthesis application 708 may ask a question about ages of the children, custody, etc.

At 314, the document synthesis application 708 may determine or verify agreement of a second user with the terms of the particular proceeding, answers to questions, or generated documents. For instance, the document synthesis application 708 may determine that a respondent agrees with documents, questions, or terms of the particular proceeding.

In some implementations, once the questions have been completed, the document synthesis application 708 may provide a webpage asking whether the other user (e.g., the respondent) agrees to the terms. In some instances, this page may be sent directly to the other user.

Figure 4A:
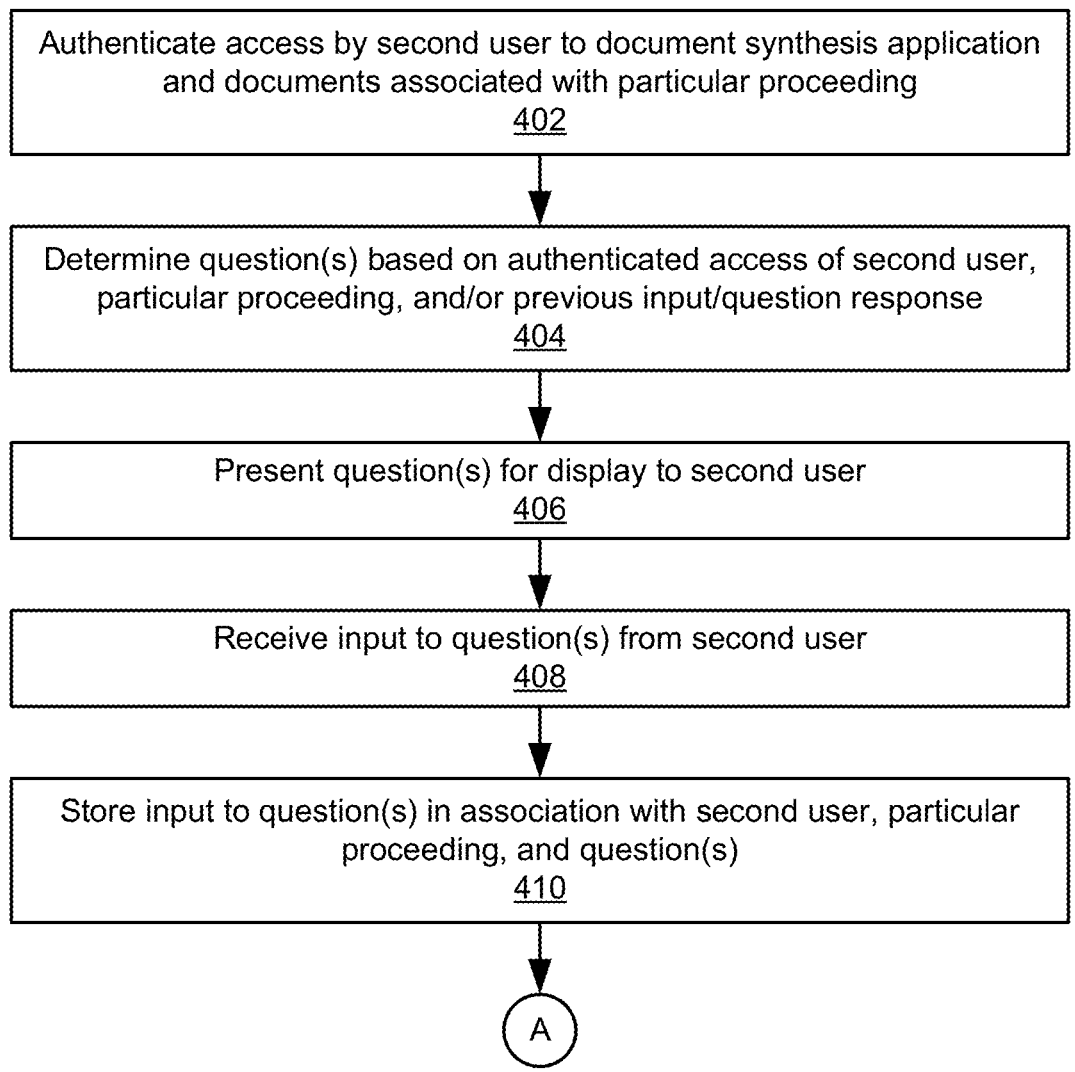
FIGS. 4A and 4B are a flowchart of an example method for receiving user input from multiple users.
Figure 4B:
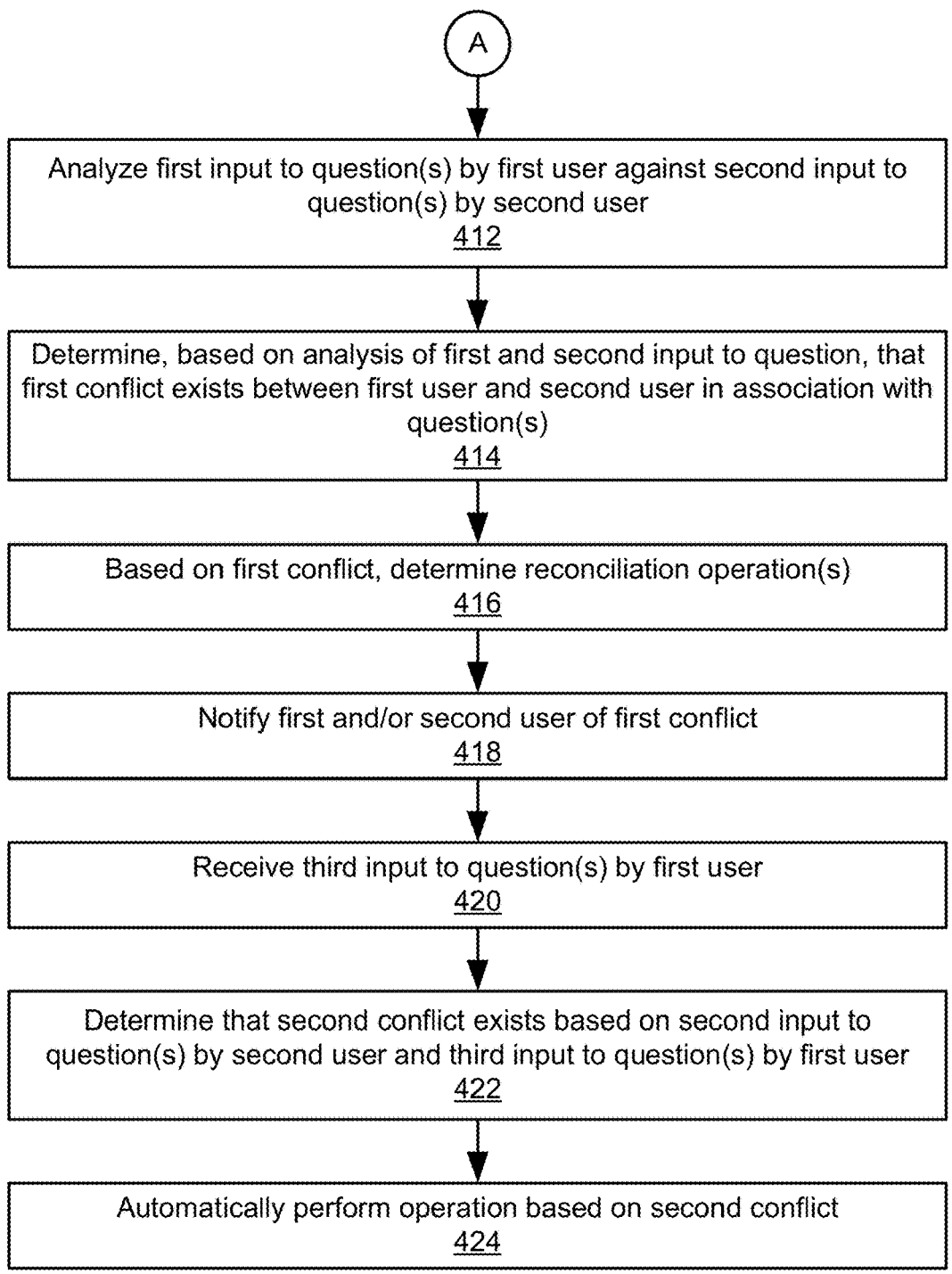

Example operations for seeking answers from the respondent, reconciling differing input from parties, and/or verifying agreement between the parties are described in reference to FIGS. 4A and 4B.

In some implementations, the document synthesis application 708 may allow a user to skip verification by the other user. For example, the document synthesis application 708 may ask a user whether they want to file the petition with the court or wait until the other user agrees with it, although other implementations are possible. If the user indicates yes (e.g., file without waiting), they may be required to then pay an additional fee and the document synthesis application 708 may generate the documents (as described elsewhere herein) and provide instructions to the user for how to file the documents. In some instances, as described below, the document synthesis application 708 may automatically file the documents with the appropriate (e.g., based on the petition type, user address, etc.) court.

At 316, the document synthesis application 708 may generate document(s) based on particular proceeding and input(s) to question(s). For instance, in response to a trigger, the document synthesis application 708 may generate one or more documents based on the particular proceeding, inputs to questions by the first user, and/or inputs to questions by the second user. In some implementations, for example, the document synthesis application 708 may prompt the user(s) to create their petition for divorce, which will be automatically drafted using the questions and associated inputs, as described above. The documents may include, for instance, a petition for divorce, a voluntary waiver of service, an agreement for default, among other potential documents. It should be noted that this list of documents is provided as an illustrative example and that many other documents or types of documents are contemplated herein.

In some implementations, generation of the documents may be based on additional conditions. For instance, the document synthesis application 708 may require an additional fee or verification, such as a certification that one or both of the parties have taken a divorce education class and uploaded their certificate to the document synthesis application 708.

At 318, the document synthesis application 708 may unlock additional functionality. For instance, the document synthesis application 708 may allow documents to be automatically created or filed or may perform other operations based on unlocked additional functionality. The additional functionality may be unlocked by paying a fee or performing an action (e.g., completing questions, uploading a certification, signing a form, and/or waiting a time period, etc.).

In some implementations, the document synthesis application 708 may receive an input requesting to unlock additional features. In response to receiving the input, the document synthesis application 708 may present one or more additional questions associated with the particular proceeding to the first user. For instance, once the first part of the proceeding/document preparation has been completed, such as a second user/respondent signing the documents, the document synthesis application 708 may proceed forward by interacting unilaterally with only one user. For example, once both parties have agreed to the terms of a document (e.g., based on user inputs, form elements, a document preview, etc., as described above), one or both of the users may pay an additional fee that allows documents to be generated, the documents to be filed, or another operation to be performed. For instance, in response to receiving a confirmed agreement by both users, the document synthesis application 708 may ask one or both users additional questions (e.g., questions that do not require agreement between the parties), allow documents to be generated, and/or allow the documents to be electronically transmitted, for example, to an electronic filing system of a court (e.g., by electronically transmitting, via application programming interface, e-mail, or other service, the documents to a third-party server 718 associated with the court). In some instances, the documents may be transmitted to associated or recommended counsel (e.g., upon agreement by a user) or the document synthesis application 708 may provide instructions to the user(s) for how to use, print, or file the documents based on the context (e.g., if the context of a workflow is a particular proceeding in a particular jurisdiction, relevant directions for filing, etc., may be provided).

FIGS. 4A and 4B are a flowchart of an example method for seeking answers from the second user, reconciling differing input from users, and/or verifying agreement between the users.

It should be noted that although examples of the method described in reference to FIGS. 4A-4B are described in reference to end users, other implementations are possible and contemplated herein. For example, the document synthesis application 708 may perform the operations of FIGS. 4A-4B via communication with one or more administrative and/or end users, although other implementations are possible.

At 402, the document synthesis application 708 may authenticate access by a second user to the document synthesis application 708 and/or documents (e.g., unlocking access to informational documents or features, as described above) associated with particular proceeding or context. In some implementations, the document synthesis application 708 may generate a unique ID or link, for example, that may be sent from the first user to the second user via e-mail, the document synthesis application 708, etc. The unique link may allow the second user to create a username and password and login to the document synthesis application 708 for the particular proceeding.

When the second user logs in to the document synthesis application 708, they may be provided access to questions for the particular proceeding. The questions may include the same or different questions as answered by the first user and, in some instances, the ability to view answers provided by the first user.

At 404, the document synthesis application 708 may determine question(s) based on authenticated access of second user, particular proceeding, and/or previous input/question response.

In some implementations, the questions asked to the second user may be the same as those asked to the first user, a reduced question set based on the answers of the first user or may follow a similar conditional question flow as described above. The questions or other form elements displayed may be based on configuration of the form elements and/or rules, as described in further detail above. Further, the questions asked to the second user may depend on both the first user's input and the second user's input, depending on the circumstances.

At 406, the document synthesis application 708 may present the question(s) for display to the second user on a graphical user interface and, at 408, the document synthesis application 708 may receive input to question(s) from second user.

In some implementations, the second user may answer the same question as the first user. The document synthesis application 708 may automatically associate and store the second user's answer with both the question and the second user, for example, to preserve the distinction between the first and second user's answers.

As described in reference to 408-424 below, in some instances, the document synthesis application 708 may automatically display the first user's input/response to the question when the question is asked or when the second user provides a conflicting input/response to the question. For example, the second user may agree with the terms, the document synthesis application 708 may generate the documents, and the second user may sign the documents. If the second user disagrees with some of the terms, the document synthesis application 708 may receive an objection, comment, or other input from the second user, which may be provided to the first user, as described above. The first user may make changes to the terms or other inputs and send the form to the second user again, may generate the documents with the original terms and offer them for the second user's signature, or chose to seek further help. In some instances, if a user does not agree, the document synthesis application 708 may automatically display a referral page for professional services to assist the users, for example, based on the context of the workflow (e.g., a divorce proceeding in Utah, certain user inputs, etc.).

At 410, the document synthesis application 708 may store input to question(s) in association with the second user, particular proceeding, and/or question(s), for example, in a computer-accessible, non-transitory electronic data file.

At 412, the document synthesis application 708 may analyze the inputs to the question(s) by the first user against inputs to the question(s) by the second user. As described above, the document synthesis application 708 may display any changes or comments to the first user.

In some implementations, at 414, the document synthesis application 708 may determine, based on the analysis of the first and second input to a question, that a first conflict exists between the first user and the second user in association with the question. For instance, the conflict may result from the users answering questions differently (e.g., number of children, custody, alimony amounts, etc.) or from the responses otherwise being inconsistent or opposing. For instance, if the first and second users' inputs stored in the data file(s) does not match, the document synthesis application 708 may automatically surface a notification (e.g., a note or graphical element) to one or both of the users indicating a change, disagreement, or inconsistency in user inputs.

At 416, the document synthesis application 708 may determine and execute, based on first conflict, one or more reconciliation operation(s). For instance, a reconciliation operation may include asking the first user if they agree with the changed input, providing mediation, recommending a lawyer, etc. In some instances, the resolution of conflicts may be deferred until the other questions are answered, so that all conflicts can be handled together and do not delay responses to other questions. In some implementations, the reconciliation operation may be that the document synthesis application 708 provides the second user's inputs to the first user, for example, based on configuration details of a rule and/or form element. For instance, a form element may be configured to adaptively display user inputs from one or both of the users or otherwise indicate when a second user has provided a comment, edit, objection, etc., to the first user. It should be noted that other operations of identifying changes, inconsistencies, or disagreements are possible and contemplated herein.

At 418, the document synthesis application 708 may notify the first and/or second user of the conflict. For instance, when the second user answers a question in such a way that a conflict is created, the document synthesis application 708 may automatically display a notification of the conflict, the first user's answer, the second user's answer (e.g., to the first user), etc. In some instances, it may automatically, or in response to an instruction from the second user, notify (e.g., via the document synthesis application 708, e-mail, etc.) the first user of the conflict, as described above.

At 420, the document synthesis application 708 may receive another input to question(s) by the first user. For instance, the document synthesis application 708 may provide the opportunity to the first user to change their answer to a question with a conflict.

At 422, the document synthesis application 708 may determine that second conflict exists based on the first user's response to the question with the conflict. For instance, the first user may accept the second user's offer, provide a counteroffer, or may reject the second user's offer. If the two parties are unable to resolve the conflict (e.g., after a threshold number of conflicts over the same question, after indication by one or both user), the document synthesis application 708 may automatically perform one or more operations based on the conflict at 424.

The display and/or reconciliation of user inputs may be configured in a form element or configured rule (e.g., in response to an inconsistent input to a form element, perform a defined operation or display defined information).

In some implementations, the document synthesis application 708 may stop the process of gathering information to generate the documents for the proceeding and lock further actions (e.g., generating documents, filing documents with a court, answering further questions, etc.) from being performed, for example, if a certain rule indicates that non-matching inputs from separate users (or another defined condition) should prevent or cause document generation, display of form elements, or another operation by the document synthesis application 708.

In some implementations, the document synthesis application 708 may automatically provide recommendations (e.g., identification, contact details, a link to a website, a link to send an e-mail, etc.) for resolving the conflict, such as attorneys, mediation services, etc.

Figure 5:
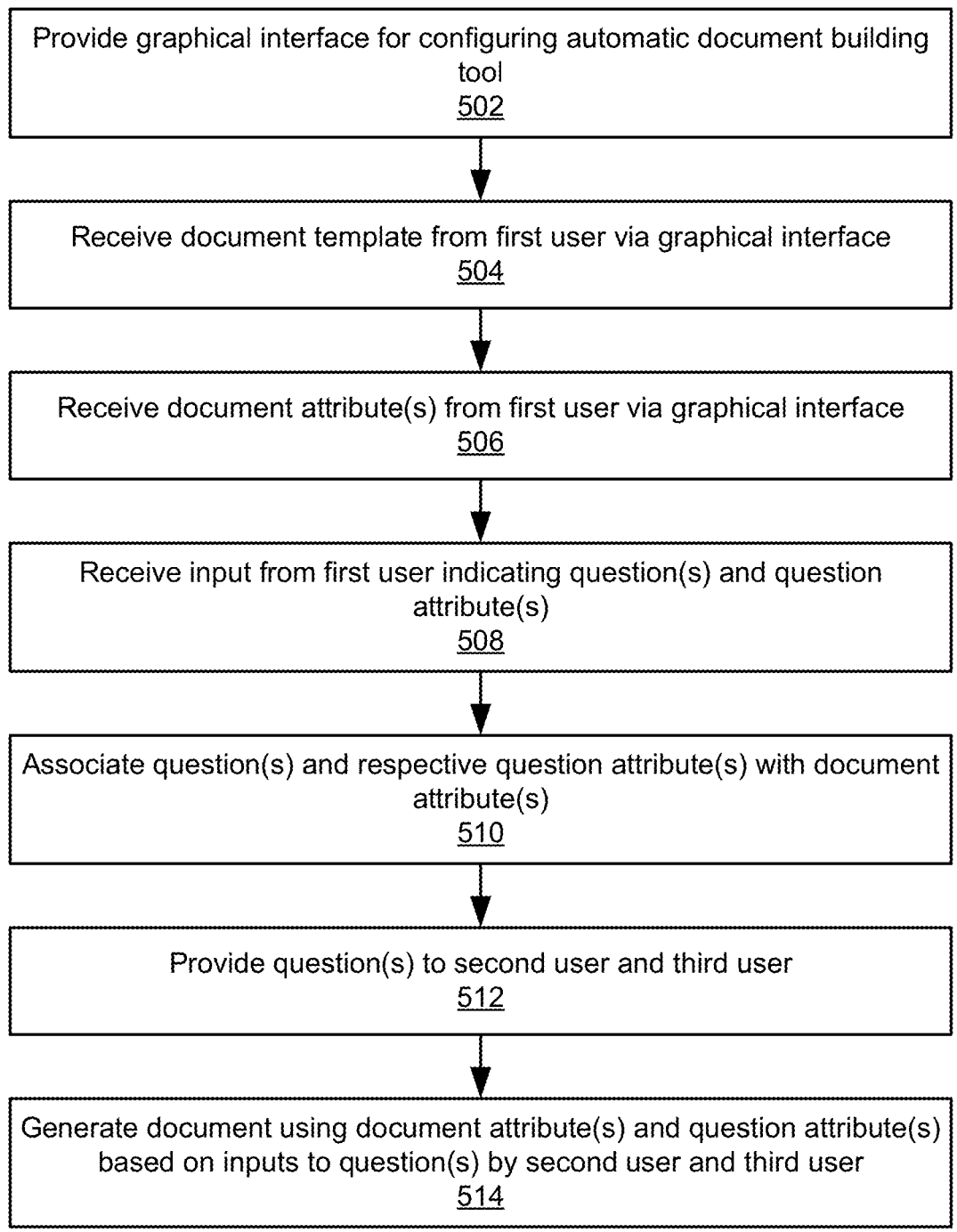
FIG. 5 is a flowchart of an example method for configuring a document-generation tool.

FIG. 5 is a flowchart of an example method for generating a document-generation tool, for example, for asking questions conditionally and automatically generating documents based on inputs and/or responses to the questions, according to some implementations. Other operations and/or additional details for these operations are described in further detail elsewhere herein and these operations may be modified without departing from the scope of this disclosure, as noted above.

It should be noted that although examples of the method described in reference to FIG. 5 are described in reference to certain users, other implementations are possible and contemplated herein. For example, one or multiple administrative users or end users may separately or collaboratively interact with the document synthesis application 708 in the operations of the method of FIG. 5. For instance, the document synthesis application 708 may interact with an administrative user in operations 502-510, one or more end users in operation 512, and one or more administrative and/or end users in operation 514, although these operations may be performed autonomously.

At 502, the document synthesis application 708 may provide one or more graphical interfaces for configuring an automatic document-generation tool.

In some implementations, at 504, the document synthesis application 708 may receive a document template from the user (e.g., an administrative user) via the graphical interface. For instance, the document synthesis application 708 may receive a template document into which fields, text, etc., can be inserted.

At 506, the document synthesis application 708 may receive document attribute(s) from the user via the graphical interface. For instance, document attributes may describe a purpose of a document, a condition upon which it is generated, template language for the document, one or more fillable fields (their existence, location, size, text size, etc.), whether the document is a fillable form or freeform/prose, and/or other attributes. For example, a document attribute may include a document element that may be inserted into a document and/or an associated rule, for example, an action rule as described above. As an example, the document synthesis application 708 may add document elements, such as defined sentences or paragraphs of text, to a free-form field or empty document page (e.g., on a blank area of a PDF or word processor document), which text, logic, or location may be defined in a rule, form element, or document element, for instance.

At 508, the document synthesis application 708 may receive an input from the administrative user indicating question(s), question attribute(s), and/or other form elements, as described above. In some instances, the question attributes may include or be associated with rules that indicate a condition for displaying the question, a procedure for reconciling inconsistent answers (e.g., between parties), an associated field of the document, an associated document, or other question attributes, conditions, and attributes, etc. In some implementations, the question attributes may additionally or alternatively include informational documents, as described above.

As described in further detail above, the document synthesis application 708 may allow an administrative user to configure different types of rules, such as display logic rules that cause the document synthesis application 708 to hide/show form elements based on rule logic, action rules that cause the document synthesis application 708 to run actions (e.g., inserting information into a document, send e-mails, request signatures, etc.), or sharing rules that define quantities and/or permissions for sharing, as described above.

At 510, the document synthesis application 708 may associate question(s) and respective question attribute(s) with document attribute(s). For instance, a user may select a particular document, condition, text field of the document, etc., with a question and/or inputs to the question. For example, the administrative user may indicate into which text field or check box of a document an input of a user may be inserted.

At 512, the document synthesis application 708 may provide question(s) to one or more users (e.g., a petitioner and/or respondent), as described above. In some implementations, the document synthesis application 708 may provide the questions in a questionnaire or other defined format, as described above.

At 514, the document synthesis application 708 may generate one or more documents using document attribute(s) and question attribute(s) based on inputs to question(s) by users. For instance, the document synthesis application 708 may automatically use the document template, document attributes, question attributes, question responses, etc., to generate the document. For example, a question may be associated with a particular textual field of a PDF document and, in response to receiving an answer to the question, the document synthesis application 708 may automatically input the answer into the particular textual field.

Workflows built by administrative users may automatically generate easy to navigate & understand forms for users. Many different types of questions can be asked, including single-select, multi-select, number input, file input, short text input, long text input, date picker, etc. Administrative users are also able to upload videos, explanations and definitions, and other resources and tools for each question, which may guide the users through what is being asked in each question and why it is being asked.

Based on the answers input by the user in response to the questions that the administrative user has configured, the document synthesis application 708 may generate PDFs or other documents, which may be preview in real time so that the user can see how their final documents will look as they answer questions or later generated upon completion of the form elements in the document-generation tool.

The document synthesis application 708 may store the data used to generate the PDF file in different places. For example, user specific data may be stored in association with specific users or proceeding and document-generation tools (e.g., workflows, form elements, document elements, templates, rules, etc.) may be stored separately and applied to different users. Similarly, the document may be rendered or generated in memory thereby allowing the document synthesis application 708 to render it on a graphical user interface dynamically as a preview or save it to a cloud or local data storage as computer-readable files.

Figure 7:
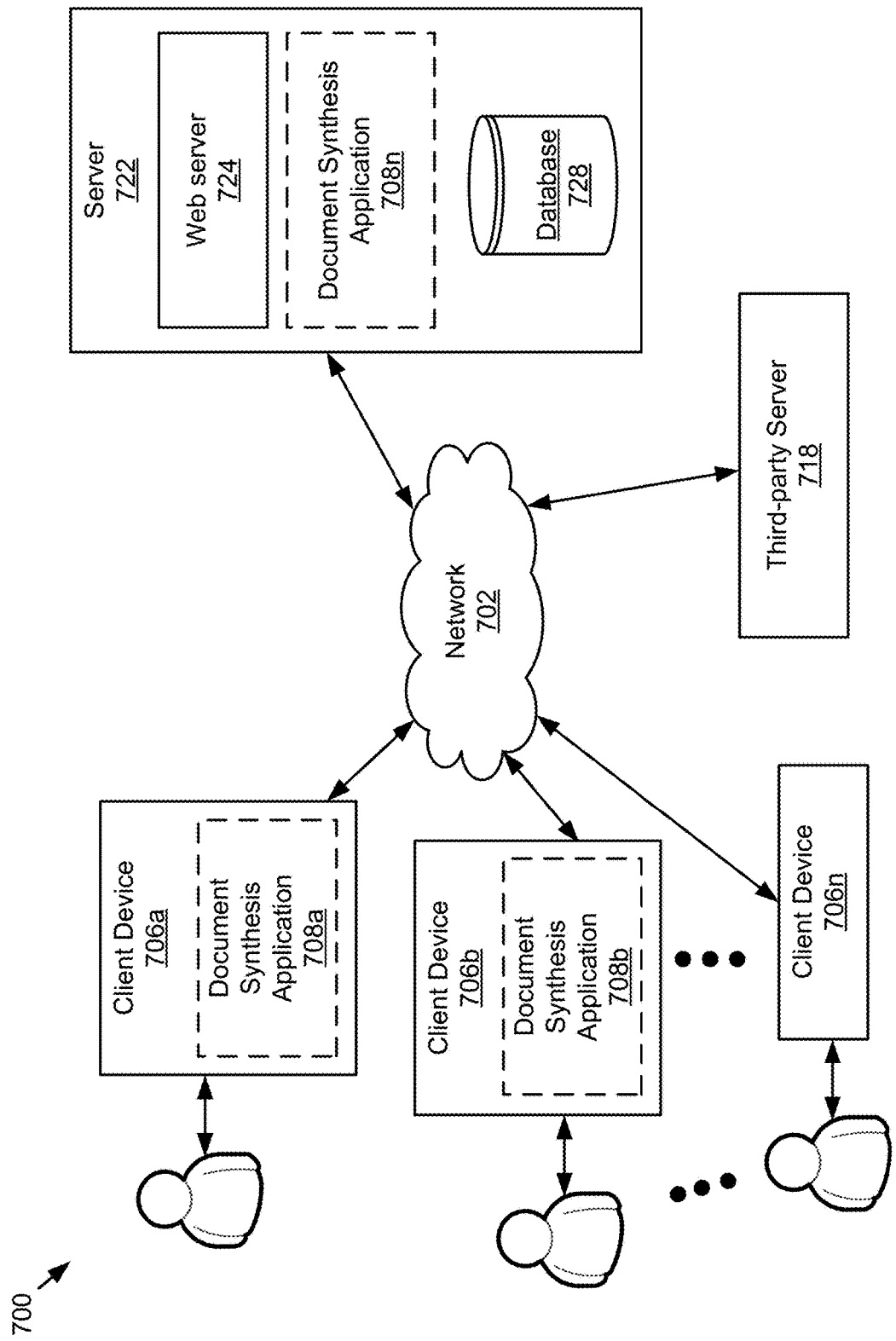
FIG. 7 is a block diagram of an example system for implementing an automated document generation and personalization system.

FIG. 7 is a block diagram of an example system 700 for implementing the technology described herein. The architecture illustrated in FIG. 7 allows the data to be accessed or stored, for instance, in either an application or web portal described above.

The illustrated system 700 may include a client device 706*a* . . . 706*n* (also referred to herein individually and/or collectively as 706), a third-party server 718, and a server 722, which are electronically communicatively coupled via a network 702 for interaction with one another, although other system configurations are possible including other devices, systems, and networks. For example, the system 700 could include any number of client devices 706, third-party servers 718, servers 722, and other systems and devices. The client devices 706*a* . . . 706*n*, and their components, may be coupled to the network 702. The server 722 and its components may be coupled to the network 702. The third-party server 718 and its components may be coupled to the network 702.

The network 702 may include any number of networks and/or network types. For example, the network 702 may include one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

A plurality of client devices 706*a* . . . 706*n* are depicted in FIG. 7 to indicate that the server 722 and its components may provide services to a multiplicity of users on a multiplicity of client devices 706*a* . . . 706*n*. In some implementations, a single user may use more than one client device 706.

The server 722 and the third-party server 718 have data processing, storing, and communication capabilities, as discussed elsewhere herein. For example, the servers 722 and/or 718 may include one or more hardware servers, server arrays, storage devices and/or systems, etc. In some implementations, the servers 722 and/or 718 may include one or more virtual servers, which operate in a host server environment. As depicted, the server 722 may include the document synthesis application 708 and the web server 724, as discussed elsewhere herein.

The third-party server 718 can host services such as a third-party application (not shown), which may be individual and/or incorporated into the services provided by the server 722. In some implementations, the third-party application may provide additional acts and/or information such as product data, audio transcription services, etc., to the server 722.

It should be understood that the system 700 illustrated in FIG. 7 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer devices, services, and/or networks, and may implement various functionality client or server-side. Further, various entities of the system may be integrated into a single computing device or system or divided into additional computing devices or systems, etc.

The client devices 706 may also store and/or operate other software such as a document synthesis application 708 (also referred to herein as the "application"), other applications, etc., that are configured to interact with the server 722 via the network 702.

The client device 706 includes one or more computing devices having data processing and communication capabilities. The client device 706 may couple to and communicate with other client devices 706 and the other entities of the system 700 via the network 702 using a wireless and/or wired connection. Examples of client devices 706 may include mobile phones, tablets, laptops, desktops, netbooks, server appliances, servers, virtual machines, TVs, voice-activated search devices or assistants, etc. The system 700 may include any number of client devices 706, including client devices of the same or different type.

The web server 724 includes computer logic executable by the processor 708 to receive, process, and respond to content requests. The web server 724 may include an HTTP server, a REST (representational state transfer) service, or other suitable server type. The web server 724 may receive content requests (e.g., page requests, order requests, other requests (e.g., HTTP), etc.) from client devices 706, cooperate with the document synthesis application 708 to determine the content, retrieve and incorporate data from the database(s) 728, format the content, and provide the content to the client devices. In some instances, the web server 724 may format the content using a web language and provide the content to a corresponding document synthesis application 708 for processing and/or providing to the user for display, although other variations are also possible.

The web server 724 may be coupled to the database(s) 728 to store retrieve, and/or manipulate data stored therein and may be coupled to the document synthesis application 708 to facilitate its operations. For example, the web server 724 may allow a user on a client device 706 to communicate with the document synthesis application 708.

The document synthesis application 708 includes computer logic executable by the processor 808 on a client device 706 or server 722 to provide for user interaction, receive user input, present information to the user via a display, and send data to and receive data from the other entities of the system 700 via the network 702. The document synthesis application 708 includes computer logic executable by the processor 808 to operations discussed elsewhere herein. As illustrated, various instances or components of the document synthesis application 708*a*, 708*b*, or 708*n* may be executed on various components of the system 700.

The web server 724, and/or the document synthesis application 708 may require the user to authenticate using known web authentication protocols in order to determine if they have permission to use the document synthesis application 708, as discussed further herein.

In a distributed model, an instance of the document synthesis application 708 configured to handle client-side (e.g., by an administrative or end-user) operations may, in cooperation with the document synthesis application 708 being used by the user, generate and transmit the data request via a computer network, such as the computer network 702 depicted in FIG. 7, to the server 722. The web server 724 may receive, process, and respond to the data request in cooperation with the server-side instance of the document synthesis application 708, as discussed elsewhere herein. For instance, the web server 724 may parse the data request for information and/or the user submitting the request and relay that information to and/or store the information for retrieval by the document synthesis application 708. In further implementations, the document synthesis application 708 residing on the server 722 may perform these acts using data stored on the server 722, the client device 706, and/or another device of the system 700, such as the third-party server 718.

Figure 8:
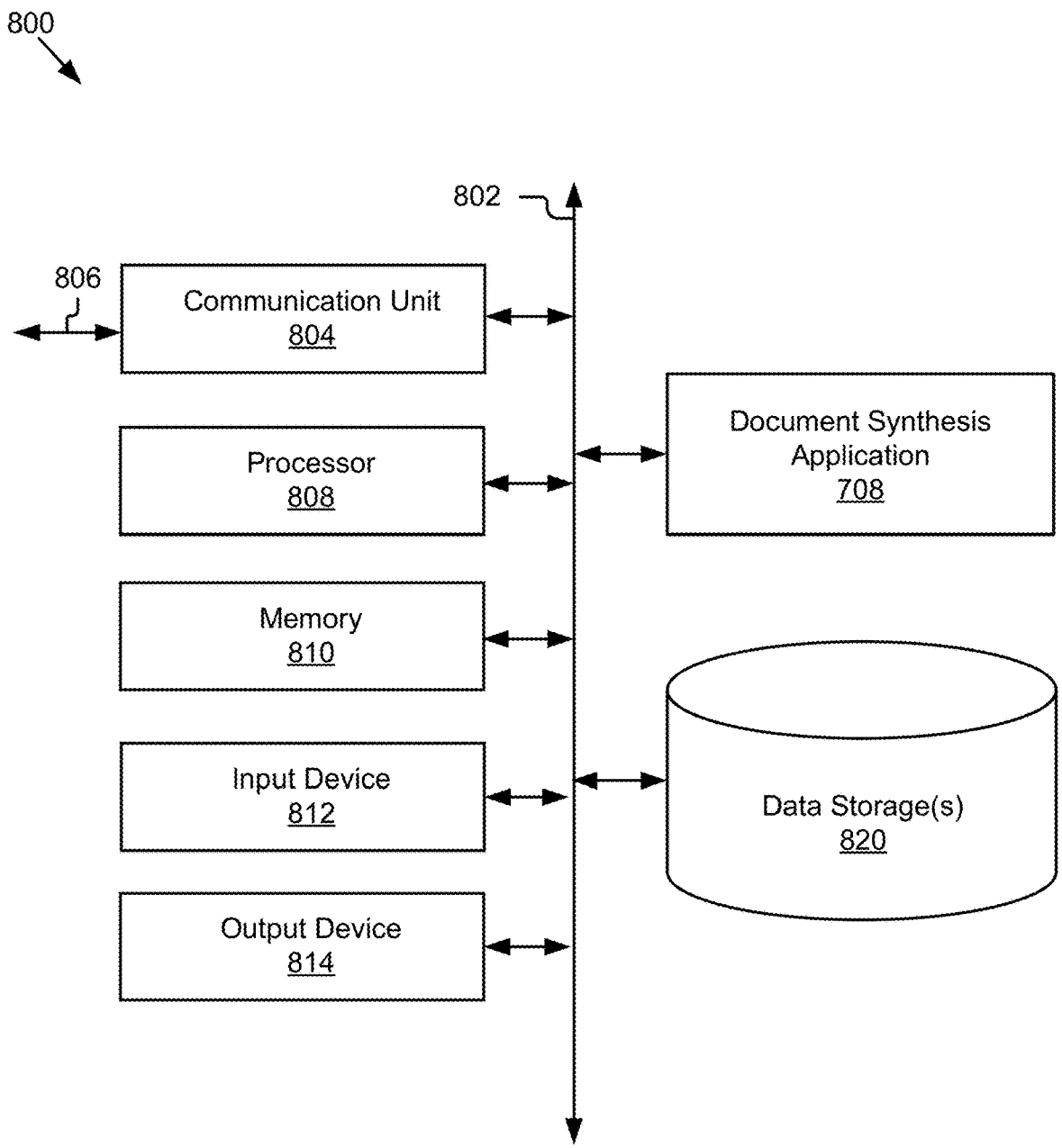
FIG. 8 illustrates an example computing device for implementing an automated document generation and personalization system.

An example computing system 800 of the technology is depicted in FIG. 8. This computing system 800 may represent the computer architecture of a client device 706, a third-party server 718, and/or a server 722, as depicted in FIG. 7, and may include different components depending on the implementation being represented.

As depicted in FIG. 8, the computing system 800 may include a document synthesis application 708, depending on the configuration, although it should be understood that other configurations are also possible. The server 722 may also include the web server 724 and/or components thereof, although other configurations are also possible and contemplated.

As depicted, the computing system 800 may include a processor 808, a memory 810, a communication unit 804, an output device 814, an input device 812, and database(s) 820 (which may correspond to database 728), which may be communicatively coupled by a communication bus 802. The computing system 800 depicted in FIG. 8 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 800 may include various operating systems, sensors, additional processors, and other physical configurations. Although, for purposes of clarity, FIG. 8 only shows a single processor 808, memory 810, communication unit 804, etc., it should be understood that the computing system 800 may include a plurality of one or more of these components.

The processor 808 may execute software instructions by performing various input, logical, and/or mathematical operations. The processor 808 may have various computing architectures to method data signals including, for example, a complex instruction set computer (CISC) architecture, a reduced instruction set computer (RISC) architecture, and/or an architecture implementing a combination of instruction sets. The processor 808 may be physical and/or virtual and may include a single core or plurality of processing units and/or cores. In some implementations, the processor 808 may be capable of generating and providing electronic display signals to a display device, supporting the display of images, capturing and transmitting images, performing complex tasks including various types of feature extraction and sampling, etc. In some implementations, the processor 808 may be coupled to the memory 810 via the bus 802 to access data and instructions therefrom and store data therein. The bus 802 may couple the processor 808 to the other components of the computing system 800 including, for example, the memory 810, the communication unit 804, the input device 812, the output device 814, and the database(s) 820.

The memory 810 may store and provide access to data to the other components of the computing system 800. The memory 810 may be included in a single computing device or a plurality of computing devices. In some implementations, the memory 810 may store instructions and/or data that may be executed by the processor 808. For example, the memory 810 may store one or more of a web server 724, a document synthesis application 708, and their respective components, depending on the configuration. The memory 810 is also capable of storing other instructions and data, including, for example, an operating system, hardware drivers, other software applications, databases, etc. The memory 810 may be coupled to the bus 802 for communication with the processor 808 and the other components of computing system 800.

The memory 810 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 808. In some implementations, the memory 810 may include one or more of volatile memory and non-volatile memory (e.g., RAM, ROM, hard disk, optical disk, etc.). It should be understood that the memory 810 may be a single device or may include multiple types of devices and configurations.

The bus 802 can include a communication bus for transferring data between components of a computing device or between computing devices, a network bus system including the network 702 or portions thereof, a processor mesh, a combination thereof, etc. In some implementations, the web server 724, document synthesis application 708, or various other components operating on the computing device 800 (operating systems, device drivers, etc.) may cooperate and communicate via a communication mechanism included in or implemented in association with the bus 802. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 804 may include one or more interface devices (I/F) for wired and wireless connectivity among the components of the system 700. For instance, the communication unit 804 may include various types of known connectivity and interface options. The communication unit 804 may be coupled to the other components of the computing system 800 via the bus 802. The communication unit 804 may be electronically communicatively coupled to the network 702 (e.g., wiredly, wirelessly, etc.), for example, as illustrated by the line 806. In some implementations, the communication unit 804 can link the processor 808 to the network 702, which may in turn be coupled to other processing systems. The communication unit 804 can provide other connections to the network 702 and to other entities of the system 700 using various communication protocols.

The input device 812 may include any device for inputting information into the computing system 800. In some implementations, the input device 812 may include one or more peripheral devices. For example, the input device 812 may include a keyboard, a pointing device, microphone, an image/video capture device (e.g., camera), a touch-screen display integrated with the output device 814, etc.

The output device 814 may be any device capable of outputting information from the computing system 800. The output device 814 may include one or more of a display (LCD, OLED, etc.), a printer, a 3D printer, a haptic device, audio reproduction device, touch-screen display, etc. In some implementations, the output device is a display which may display electronic images and data output by the computing system 800 for presentation to a user. In some implementations, the computing system 800 may include a graphics adapter (not shown) for providing and outputting the images and data for presentation on output device 814. The graphics adapter (not shown) may be a separate processing device including a separate processor and memory (not shown) or may be integrated with the processor 808 and memory 810.

The database(s) 820 are information source(s) for storing and providing access to data. The data stored by the database(s) 820 may organized and queried using various criteria including any type of data stored by them. The database(s) 820 may include file systems, data tables, documents, databases, or other organized collections of data.

The components of the computing system 800, may be communicatively coupled by the bus 802 and/or the processor 808 to one another. In some implementations, the components 724 and/or 708 may include computer logic (e.g., software logic, hardware logic, etc.) executable by the processor 808 to provide their acts and/or functionality. In any of the foregoing implementations, these components 724 and/or 708 may be adapted for cooperation and communication with the processor 808 and the other components of the computing system 800.

The database(s) 820 may be included in the computing system 800 or in another computing system and/or storage system distinct from but coupled to or accessible by the computing system 800. The database(s) 820 can include one or more non-transitory computer-readable mediums for storing the data. In some implementations, the database(s) 820 may be incorporated with the memory 810 or may be distinct therefrom. In some implementations, the database(s) 820 may store data associated with a database management system (DBMS) operable on the computing system 800. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects may not be mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims. Additionally, the disclosure is in no way limited to implementation in any specific programming language, or for any specific operating system or environment.

What is claimed is:

1. A computer-implemented method comprising:
providing, by one or more processors, a graphical user interface for configuring a document-generation tool to an administrative user, the document-generation tool receiving user inputs and generating a document based on the received user inputs of the administrative user;
determining, by the one or more processors, one or more form elements of the document-generation tool, a first form element of the one or more form elements defining an attribute of the document-generation tool;
generating, by the one or more processors on the graphical user interface, a graphical form preview of the document-generation tool based on the first form element;
determining, by the one or more processors, one or more rules of the document-generation tool in association with the one or more form elements based on the user inputs from the administrative user, each of the one or more rules defining a condition and an action executable by the one or more processors based on the condition, a first rule of the one or more rules configuring the first form element to receive a first user input from a first user and a second user input from a second user into the first form element in the document-generation tool, the document-generation tool receiving the first user input from the first user based on authenticated access by the first user and receiving the second user input from the second user based on authenticated access by the second user; and
updating, by the one or more processors, the graphical form preview on the graphical user interface based on the first rule.

2. The computer-implemented method of claim 1, further comprising:
associating, by the one or more processors, the document with the one or more form elements in a processor-accessible database; and
generating, by the one or more processors on the graphical user interface, a graphical document preview of the document using the one or more form elements and the one or more rules.

3. The computer-implemented method of claim 2, further comprising:
determining, by the one or more processors, a document element defining data, the one or more rules linking a second rule of the one or more rules with the document element; and
inserting, by the one or more processors, the data into the graphical document preview based on a condition of the second rule being satisfied.

4. The computer-implemented method of claim 3, wherein:
the first form element includes a question requesting user input;
the data includes textual information determined based on the user input; and
the condition of the second rule defines the user input and an action of the second rule causes the one or more processors to insert the textual information into the document.

5. The computer-implemented method of claim 4, wherein:
the graphical document preview is provided on the graphical user interface using the textual information based on the user input;
the graphical document preview and the graphical form preview are displayed simultaneously on the graphical user interface; and
the graphical form preview is adapted to receive the user input and the one or more processors modify the graphical document preview based on the user input received by the graphical form preview.

6. The computer-implemented method of claim 1, wherein:
the first form element includes a question requesting a user input;
the one or more form elements include a second form element that affects a graphical arrangement of the graphical form preview; and
a condition of the first rule defines a specific user input and an action of the first rule includes rendering the second form element on the graphical form preview of the graphical user interface based on the specific user input.

7. The computer-implemented method of claim 1, wherein:
the one or more rules include a second rule that, when satisfied, inserts textual information including text of the first user input into the document; and
a sequential numbering of document elements in the document is automatically updated based on the insertion of the textual information.

8. The computer-implemented method of claim 1, wherein the one or more form elements include:
a multi-checkbox input,
a header including a textual heading describing an aspect of the document-generation tool, and
a graphical formatting definition affecting a graphical arrangement of the graphical form preview including the multi-checkbox input and the header.

9. The computer-implemented method of claim 1, further comprising:
publishing, by the one or more processors, the document-generation tool including providing electronic access to the document-generation tool to a client computing device of the first user.

10. The computer-implemented method of claim 9, further comprising:
providing, by the one or more processors, a second graphical user interface for display to the first user on the client computing device, the second graphical user interface allowing interaction with the document-generation tool by the first user;
receiving, by the one or more processors via the second graphical user interface, the first user input from the first user indicating a first user interaction with the first form element;
adapting, by the one or more processors, the second graphical user interface based on the first rule and the first user input; and
storing, by the one or more processors, a first electronic data file associating the first user input with the first form element in a database accessible to the one or more processors.

11. The computer-implemented method of claim 10, further comprising:
receiving, by the one or more processors via the second graphical user interface, a request from the first user to share the first form element in a third graphical user interface with the second user;
determining, by the one or more processors, that sharing the first form element with the second user is allowed based on a second rule of the one or more rules, the second rule defining a quantity or access level for sharing at least the first form element; and providing, by the one or more processors, the third graphical user interface allowing interaction with the first form element by the second user.

12. The computer-implemented method of claim 11, further comprising:

duplicating, by the one or more processors, the first electronic data file including the first user input to generate a second electronic data file;

providing, by the one or more processors for display on the third graphical user interface, the first form element to the second user and a graphical representation of the first user input based on the second electronic data file;

receiving, by the one or more processors via the third graphical user interface, the second user input indicating a second user interaction with the first form element by the second user; and modifying, by the one or more processors, the second electronic data file based on the second user input.

13. The computer-implemented method of claim 12, further comprising:

providing, by the one or more processors, the second graphical user interface to the first user including modifying the second graphical user interface to display the second user input based on the second electronic data file;

receiving, by the one or more processors, a third user input from the first user;

associating, by the one or more processors, the third user input with the first form element in one or more of the first electronic data file and the second electronic data file; and generating, by the one or more processors, the document based on the third user input.

14. A system comprising:

one or more processors; and a non-transitory computer memory storing instructions that, when executed by the one or more processors, cause the system to:

provide a graphical user interface for configuring a document-generation tool, to an administrative user, the document-generation tool receiving user inputs and generating a document based on the received user inputs;

determine one or more form elements of the document-generation tool, a first form element of the one or more form elements defining an attribute of the document-generation tool of the administrative user;

generate, using the graphical user interface, a graphical form preview of the document-generation tool based on the first form element;

determine one or more rules of the document-generation tool in association with the one or more form elements based on the user inputs from the administrative user, each of the one or more rules defining a condition and an action executable by the one or more processors based on the condition, a first rule of the one or more rules configuring the first form element to receive a first user input from a first user and a second user input from a second user into the first form element in the document-generation tool, the document-generation tool receiving the first user input from the first user based on authenticated access by the first user and receiving the second user input from the second user based on authenticated access by the second user; and update the graphical form preview on the graphical user interface based on the first rule.

15. The system of claim 14, wherein the instructions, when executed by the one or more processors, further cause the system to:

associate the document with the one or more form elements in a processor-accessible database; and generate, using the graphical user interface, a graphical document preview of the document using the one or more form elements and the one or more rules.

16. The system of claim 15, wherein the instructions, when executed by the one or more processors, further cause the system to:

determine a document element defining data, the one or more rules linking a second rule of the one or more rules with the document element; and insert the data into the graphical document preview based on a condition of the second rule being satisfied.

17. The system of claim 16, wherein:

the first form element includes a question requesting user input;

the data includes textual information determined based on the user input; and the condition of the second rule defines the user input and an action of the second rule causes the one or more processors to insert the textual information into the document.

18. The system of claim 17, wherein:

the graphical document preview is provided on the graphical user interface using the textual information based on the user input;

the graphical document preview and the graphical form preview are displayed simultaneously on the graphical user interface; and the graphical form preview is adapted to receive the user input and the one or more processors modify the graphical document preview based on the user input received by the graphical form preview.

19. The system of claim 14, wherein:

the first form element includes a question requesting a user input;

the one or more form elements include a second form element that affects a graphical arrangement of the graphical form preview; and a condition of the first rule defines a specific user input and an action of the first rule includes rendering the second form element on the graphical form preview of the graphical user interface based on the specific user input.

20. A system comprising:

means for providing a graphical user interface for configuring a document-generation tool to an administrative user, the document-generation tool receiving user inputs and generating a document based on the received user inputs of the administrative user;

means for determining one or more form elements of the document-generation tool, a first form element of the one or more form elements defining an attribute of the document-generation tool;

means for generating, using the graphical user interface, a graphical form preview of the document-generation tool based on the first form element;

means for determining one or more rules of the document-generation tool in association with the one or more form elements based on the user inputs from the administrative user, each of the one or more rules defining a condition and an action executable based on the condition, a first rule of the one or more rules configuring the first form element to receive a first user input from a first user and a second user from a second user input into the first form element in the document-generation tool, the document-generation tool receiving the first user input from the first user based on authenticated access by the first user and receiving the second user input from the second user based on authenticated access by the second user, and means for updating the graphical form preview on the graphical user interface based on the first rule.

\* \* \* \* \*